(12) United States Patent
Li et al.

(10) Patent No.: US 10,367,810 B2
(45) Date of Patent: Jul. 30, 2019

(54) ELECTRONIC SUBSCRIBER IDENTITY MODULE (ESIM) INSTALLATION AND TESTING

(71) Applicant: Apple Inc., Cupertino, CA (US)

(72) Inventors: Li Li, Los Altos, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/720,454

(22) Filed: Sep. 29, 2017

(65) Prior Publication Data

US 2018/0351945 A1    Dec. 6, 2018

Related U.S. Application Data

(60) Provisional application No. 62/513,368, filed on May 31, 2017.

(51) Int. Cl.
*H04W 8/20* (2009.01)
*H04W 12/06* (2009.01)
(Continued)

(52) U.S. Cl.
CPC .......... *H04L 63/0853* (2013.01); *G06F 21/57* (2013.01); *H04B 1/3816* (2013.01);
(Continued)

(58) Field of Classification Search
CPC ............................. H04W 12/06; H04W 12/08; H04L 63/0853; H04L 63/0869
See application file for complete search history.

(56) References Cited

U.S. PATENT DOCUMENTS 9,032,186 B2    5/2015   Robertson et al.
9,609,458 B2    3/2017   Ramanna et al.
(Continued)

FOREIGN PATENT DOCUMENTS

DE    102015119800 A1    5/2017

OTHER PUBLICATIONS

Elaine Barker, et al., Recommendation for Pair-Wise Key Establishment Schemes Using Discrete Logarithm Cryptography, , NIST National Institute of Standards and Technology, NIST Special Publication 800-56A, Revision 2, May 2013, pp. 1-138.

(Continued)

*Primary Examiner* — Simon Nguyen
(74) *Attorney, Agent, or Firm* — Dickinson Wright RLLP

(57) ABSTRACT

Provisioning of an electronic subscriber identity module (eSIM) to an embedded universal integrated circuit card (eUICC) is observed to acquire a captured payload. The captured payload is then used in replay test sessions. In a live test session, test equipment can be used to monitor the communication between an eSIM server and the eUICC in order to capture the payload transmitted from the eSIM server. In the live test session, the eUICC can be in a debug mode that persists an ability to generate the same keys. In the replay test sessions, the payload captured can be reused and the eUICC can regenerate the same keys to decrypt an encrypted eSIM in the payload. After an installation attempt, the eUICC can provide notifications to the test equipment. The eUICC can be stress-tested using methods described herein without consuming a large number of eSIMs from an eSIM server inventory.

20 Claims, 14 Drawing Sheets

(51) Int. Cl.

| | |
|---|---|
| *H04W 12/08* | (2009.01) |
| *H04B 1/3816* | (2015.01) |
| *H04W 12/04* | (2009.01) |
| *G06F 21/57* | (2013.01) |
| *H04L 29/06* | (2006.01) |
| *H04W 12/10* | (2009.01) |
| *G06F 21/72* | (2013.01) |

(52) U.S. Cl.
CPC ........ *H04L 63/0869* (2013.01); *H04L 63/123* (2013.01); *H04W 8/205* (2013.01); *H04W 12/04* (2013.01); *G06F 21/72* (2013.01); *H04W 12/06* (2013.01); *H04W 12/08* (2013.01); *H04W 12/10* (2013.01)

(56) References Cited

U.S. PATENT DOCUMENTS

| | | | |
|---|---|---|---|
| 9,628,981 B2 | 4/2017 | Park et al. | |
| 2015/0121066 A1* | 4/2015 | Nix | H04W 4/70 |
| | | | 713/155 |
| 2015/0296379 A1* | 10/2015 | Nix | H04L 9/0869 |
| | | | 713/171 |
| 2016/0105411 A1* | 4/2016 | Vallieres | H04L 9/12 |
| | | | 726/3 |
| 2016/0302061 A1* | 10/2016 | Park | H04W 12/04 |
| 2017/0142121 A1* | 5/2017 | Lee | H04L 63/0428 |
| 2017/0156051 A1 | 6/2017 | Park et al. | |
| 2018/0123803 A1* | 5/2018 | Park | H04L 9/14 |

OTHER PUBLICATIONS

German Patent Application No. 10 2017 212 994.8—First Examination Report dated Mar. 29, 2018.

\* cited by examiner

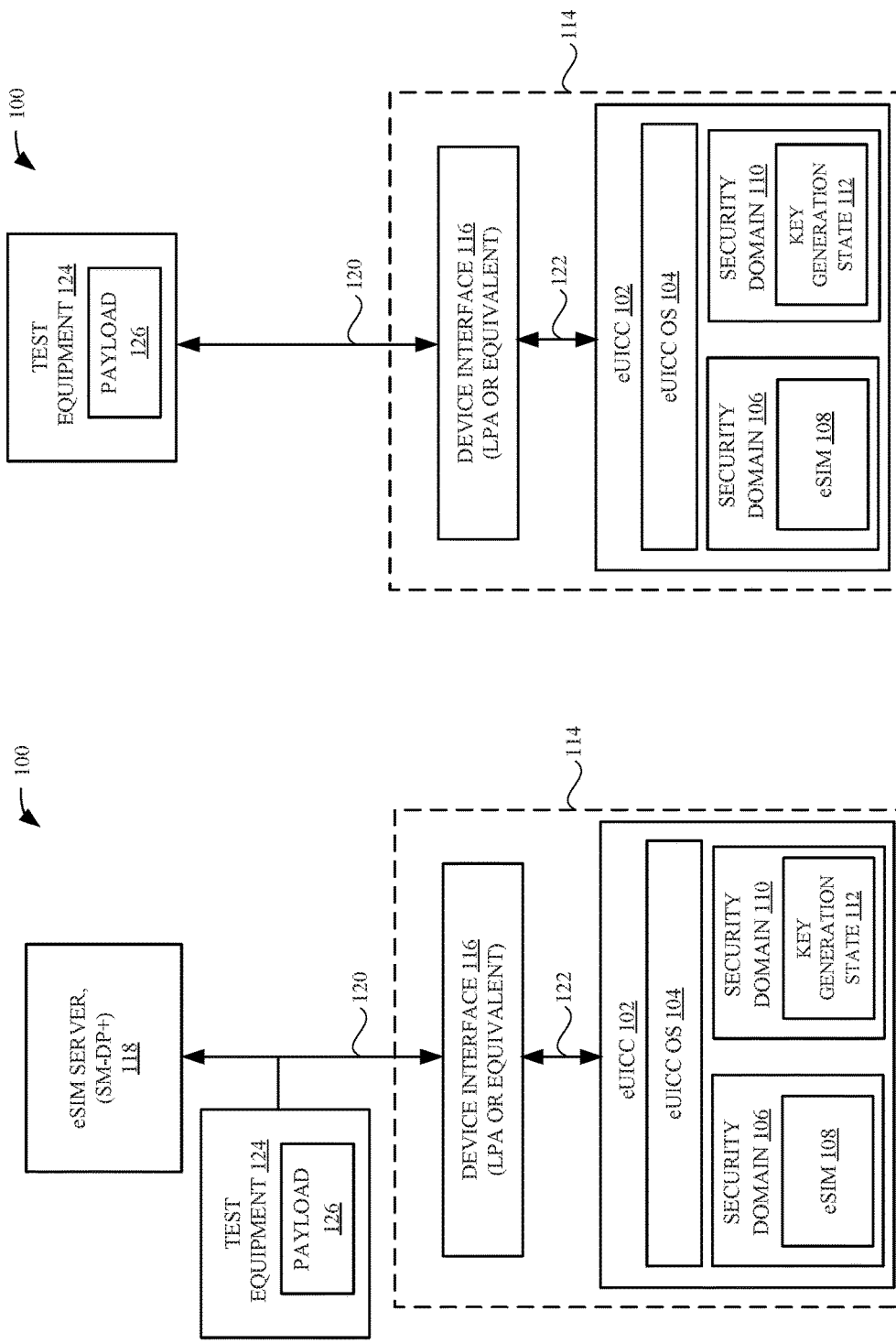

ELECTRONIC SUBSCRIBER IDENTITY MODULE (ESIM) INSTALLATION AND TESTING

CROSS-REFERENCE TO RELATED APPLICATION

This application claims the benefit of U.S. Provisional Application No. 62/513,368, filed May 31, 2017, entitled "ELECTRONIC SUBSCRIBER IDENTITY MODULE (eSIM) INSTALLATION AND TESTING", which is incorporated by reference herein in its entirety.

FIELD

The described embodiments relate to testing of installation of an electronic subscriber identity module (eSIM) on a universal integrated circuit card.

BACKGROUND

Various entities can be involved in providing a wireless network to a wireless device. For example, a wireless operator can be a company providing wireless cellular network services. A mobile network operator (MNO) can be an entity providing access capability and communication services to its subscribers through a mobile network infrastructure. A Subscriber Identity Module (SIM) vendor can be an entity distributing a SIM to a device. In some cases, the device is user equipment used in conjunction with a Universal Integrated Circuit Card (UICC) to connect to a mobile network. An end user or customer is a person using a device.

It has become increasingly common for a device to host an embedded Universal Integrated Circuit Card (eUICC), which can be a component that is carried on the device's circuit board. An eUICC can be a secure element (SE) that can store one or more electronic Subscriber Identity Modules (eSIMs).

To gain network access, a wireless device should be provisioned with a profile (which can be a SIM or an eSIM). In the case of an eSIM, aspects of eSIM provisioning include the downloading, installing, enabling, disabling, switching and deleting of an eSIM on an eUICC. A profile is a combination of operator data and applications provisioned on an eUICC in a device for the purposes of providing services by an operator. A profile can contain one or more secure data used to prove identity and thus verify contract rights to services.

One aspect of eSIM provisioning is to establish a secure session between an eSIM server (eSIM vendor) and an eUICC to ensure that the proprietary information contained in an eSIM, which can include secret keys of wireless provider and confidential information of the end user, will not be revealed. Hence, various authentication and encryption procedures, including public key infrastructure (PKI) techniques, can be employed in an eSIM provisioning session to establish trust between communicating entities and ensure security of confidential information.

A provisioning of an eSIM to an eUICC may fail because of various reasons, including, for example, a failure in authentication and an error in any provisioning step. An error occurring during a provisioning session can adversely affect user experience. One reason is that a provisioning session can involve multiple parties and a number of authentication steps. The cause of an error may be difficult to detect. One component that is involved in the provisioning of an eSIM is the eUICC's operating system (eUICC OS), which controls the data and the operation of the eUICC. If an error occurs at the eUICC OS, it may affect the proper functioning of the wireless device.

SUMMARY

Representative embodiments set forth herein disclose various systems and techniques for testing the operating system of an eUICC and a wireless device that hosts the eUICC.

To ensure the best user experience, an eUICC OS is tested by embodiments provided herein so that errors related to the eUICC will not occur or will at least be minimized during provisioning sessions of eSIMs to devices. Specifically, embodiments described herein relate to methods of testing and design of an eUICC. The design and testing allow stress testing of an eUICC for provisioning and installation of eSIMs.

To test the OS of an eUICC included in a wireless device, sometimes it is important to connect the wireless device to an actual eSIM server and perform an actual provisioning session. However, the manufacturers of eUICCs or of wireless devices are usually different entities than the party hosting the eSIM server. Each eSIM is associated with a number called an ICCID (Integrated Circuit Card Identifier). In some instances, the eSIM vendor and/or associated wireless operator assigns a unique International Mobile Subscriber Identity (IMSI) to the eSIM. The ICCID and IMSI are unique and conserved. For example, two eSIMs with the same ICCID are not distributed in the marketplace. A typical provisioning session removes an eSIM from an eSIM inventory, and an eSIM cost is associated with this. Hence, repeated testing of an eUICC OS using actual provisioning sessions would consume a large number of eSIMs from eSIM vendor/wireless operator inventory. The embodiments described herein reduce the number of eSIMs taken from the inventory and minimize any security concern of revealing proprietary information in an eSIM used for the testing.

According to some embodiments, an eUICC can be stress tested for multiple iterations of eSIM provisioning and installation. The testing can be achieved through capturing a payload transmitted by an eSIM server in a live test session and replaying the captured payload in replay test sessions. The captured payload represents a particular eSIM. A typical eSIM installation uses nonce values generated at both the wireless device and the eSIM server in order to prevent replay attacks by malicious parties. A debug mode and some debug functions can be added in an eUICC. The debug mode can temporarily suspend the replay attack avoidance aspect. The debug can cause the eUICC to disable some authentication and/or verification procedures in the replay test sessions to allow the captured payload that contains the particular eSIM to be installed again. During provisioning, the eUICC generates one-time keys and a session key. The one-time keys may also be referred to herein as ephemeral keys. The debug mode can cause the eUICC to persist the ability to generate the same keys for the replay test sessions to decrypt the encrypted particular eSIM profile included in the captured payload. Since the payload is captured from an actual eSIM server, the eUICC is stress tested using a typical eSIM. Because replay test sessions use the captured payload to conduct the testing, the testing does not consume a large number of eSIMs from inventory.

According to some embodiments, testing can begin with a live test session between an eUICC and an eSIM server. The live test session here can refer to an eSIM provisioning session in which an actual eSIM server will generate an actual eSIM. Test equipment can be used to monitor the communication between the eUICC and the eSIM server. The test equipment can be a computer or a part of device software that can act as a test server. The eUICC can generate a one-time pair of public key and private key for the eUICC. The eSIM server can also generate a one-time pair of public key and private key for the eSIM server. Based on the public key of the eUICC and the private key of the eSIM server, the eSIM server can generate a shared secret that can include a session key. The eSIM server can encrypt the eSIM using the session key and can transmit a payload that includes the encrypted eSIM to the eUICC. The test equipment, which is monitoring the provisioning session, can capture the payload. When the eUICC receives the payload, the eUICC can generate the session key based on the public key of the eSIM server and the private key of the eUICC, use the session key to decrypt the encrypted eSIM, and install the eSIM. Moreover, the eUICC can persist the ability to generate the same key public-private key pair, for example by storing the key generation state (e.g. a seed) of this live test session in a security domain or another memory. Since the key-related information is protected and only known to the specific eUICC, the saving of the key generation state does not sacrifice the security of an eUICC.

In replay test sessions, according to some embodiments, the test equipment can take the place of the eSIM server and provide again the captured payload to the eUICC. The debug mode of the eUICC can cause the eUICC to bypass one or more authentication or verification procedures that are normally present in an eSIM provisioning session. For example, a verification of an eSIM server's signature on an eUICC challenge can be bypassed in the eUICC, based on a debug configuration. The eUICC can generate the same eUICC public-private key pair using the stored key generation state. When the eUICC receives the captured payload, the eUICC can then use the same eUICC private key and the eSIM server public key that is included in the captured payload to derive the same session key, which is used to decrypt the encrypted eSIM to obtain a recovered eSIM. The eUICC can then attempt to install the recovered eSIM. After the eSIM is installed, the eUICC, in concert with the test equipment, can perform other related post-installation actions such as generating and sending notifications that record the installation results, removing the notifications, deleting the installed eSIM, and restarting another session of replay testing. By using the same payload while bypassing some of the authentication and/or verification steps, the eUICC can be stress tested using an actual eSIM numerous times without having to remove an additional eSIM from inventory for each profile installation attempt.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 1A and 1B illustrate exemplary systems for provisioning and testing of the provisioning of an eSIM on an eUICC, in accordance with some embodiments.

Figure 2A:
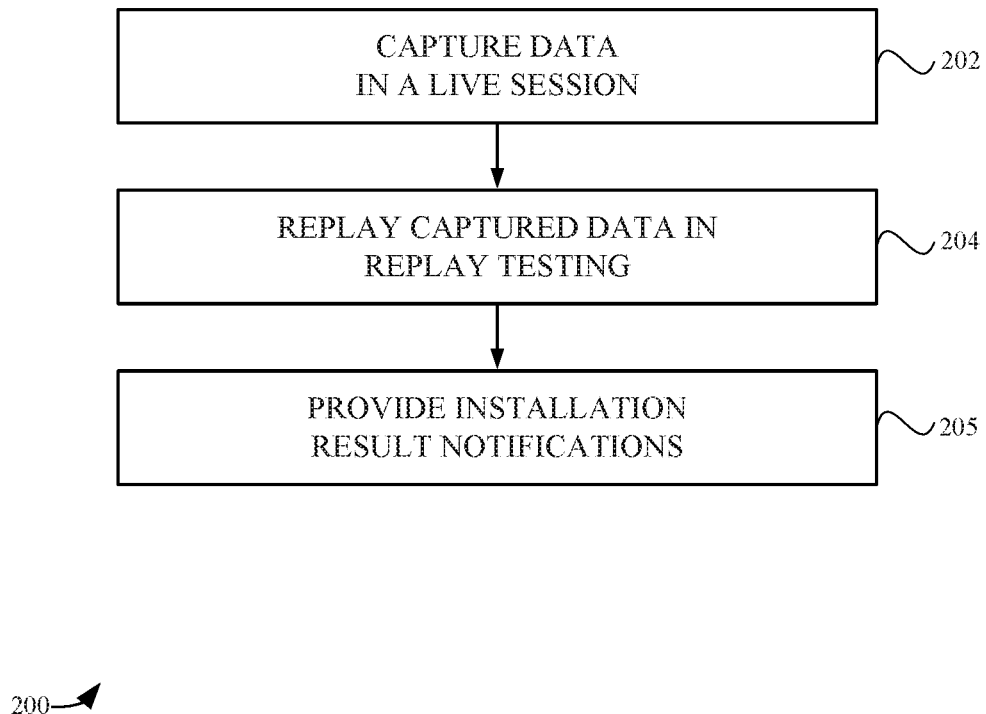
FIG. 2A illustrates an exemplary logic flow of testing of an eUICC in accordance with some embodiments.

Those skilled in the art will appreciate and understand that, according to common practice, various features of the drawings discussed below are not necessarily drawn to scale, and that dimensions of various features and elements of the drawings can be expanded or reduced to more clearly illustrate the embodiments of the present invention described herein.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A wireless device can host an embedded universal integrated circuit card (eUICC) that can be provisioned with one or more profiles. During the provisioning, a profile can be installed into a memory of the eUICC. Such a profile can also commonly be referred to as an electronic subscriber identity module (eSIM). An operating system (OS) of the eUICC can accept or reject the profile package based on compatibility, format, and/or authentication. Because the eUICC OS controls the installation of the eSIM, it is important for the eUICC OS to operate without error. Embodiments disclosed herein provide methods and new eUICCs that allow the eUICC OS to be stress tested without consuming a large number of eSIMs and without raising any security concerns. Before describing the methods, servers, and devices involved with this solution, an eSIM provisioning process and terminology will first be described.

eSIM Provisioning

A function which provides profile packages is known as a subscription manager data preparation (SM-DP, or SM-DP+). The profile package transmitted from the subscription manager can sometimes be referred to as a bound profile package (BPP). An SM-DP may also be referred to as a profile provider, an eSIM server, or as an eSIM vendor. An eSIM is an electronic SIM. A physical SIM can be an electronic card, which can be inserted into a wireless device. An eSIM is an example of a profile. A profile package can be a personalized profile using an interoperable description format that is transmitted to an eUICC as the basis for loading and installing a profile. Profile data which is unique to a subscriber, e.g., a phone number or an International Mobile Subscriber Identity (IMSI), are examples of personalization data. The eSIM server communicates over an interface with an eUICC. Certificates used for authentication and confidentiality purposes can be generated by a trusted certificate issuer.

A document related to remote provisioning and management of eUICCs in devices is outlined in GSM Association document GSMA SGP.22: "RSP Technical Specification," Version 1.2 Feb. 27, 2017 (hereinafter "SGP.22").

eUICC Description

An eUICC includes an OS, and the OS can include ability to provide authentication algorithms to network access applications associated with a given operator. The OS also can include the ability to translate profile package data into an installed profile using a specific internal format of the eUICC. An ISD-P (issuer security domain-profile) can host a unique profile within an eUICC. The ISD-P is a secure container or security domain for the hosting of the profile. The ISD-P is used for profile download and installation based on a received bound profile package. A bound profile package is a profile package which has been encrypted for a target eUICC. An ISD-R (issuer security domain-root) is a function in an eUICC responsible for the creation of new ISD-Ps on the eUICC. An ECASD (eUICC controlling authority security domain) provides secure storage of credentials needed to support the security domains on an eUICC. A controlling authority security domain (CASD) may also be referred to as a "key store" herein. A security domain within the eUICC contains the operator's over the air (OTA) keys and provides a secure OTA channel. OTA keys are credentials used by an operator for remote management of operator profiles on an eUICC.

Some activities related to an eUICC resident in a device may be performed by the device. Examples of such activities are profile download assistance and local user interface functions. More information on profile download assistance and local user interface functions can be found in SGP.22.

Public Key Infrastructure Techniques

Communications of an eUICC may be authenticated using PKI techniques. The cryptography techniques disclosed herein are applicable to eUICCs, UICCs, and SEs (secure elements). Certificates used for authentication and confidentiality purposes can be generated by a trusted certificate issuer (CI or root CA). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. This pair taken together may be referred to herein as a public key—private key pair or as a public-private key pair. A user or message recipient may use an on-line protocol such as on-line certificate status protocol (OCSP) to determine if a certificate is valid.

The eUICC OS can include ability to provide authentication algorithms to network access applications associated with a given operator. The OS also can include the ability to translate profile package data into an installed profile using a specific internal format of the eUICC. An ECASD provides secure storage of credentials needed to support the security domains on the eUICC. A controlling authority security domain (CASD) may also be referred to as a "key store" herein.

Elliptic Curve Cryptography Key Agreement (ECKA)

An eUICC can generate an ephemeral eUICC public key otPK.eUICC.ECKA (with ephemeral eUICC private key, otSK.eUICC.ECKA) and an eSIM server can generate an ephemeral eSIM server public key otPK.DP.ECKA (with ephemeral eSIM server private key, otSK.DP.ECKA) to create an input for a key derivation process to create a shared secret that can include a session key for encryption, S-ENC. More details of key derivation can be found in SGP.22. An ephemeral public key can be referred to as otPK and an ephemeral private key can be referred to as otSK.

Embodiments are discussed below with reference to FIGS. 1A-12; however, those skilled in the art will readily appreciate that the detailed description given herein with respect to these figures is for explanatory purposes only and should not be construed as limiting.

System

FIGS. 1A and 1B illustrate an exemplary system 100 for testing the provisioning and installation of eSIMs on an eUICC 102 in order to examine the proper functioning of the eUICC OS 104. FIG. 1A illustrates a configuration for a live test session and FIG. 1B illustrates a configuration for subsequent sessions of replay testing. A live test session can sometimes also be referred to as a first eSIM installation session, a first test installation session, or simply a first installation session. A subsequent session of replay testing can sometimes also be referred to as a second eSIM installation session, a second test installation session, or simply a second installation session. Referring first to FIG. 1A, the eUICC 102 can include the eUICC OS 104, a security domain 106 for storage of one or more eSIMs (including the eSIM 108), and a security domain 110 for storage of key generation state 112 for purposes that will be discussed in detail below. The security domains can be sectors of one or more memories. The security domains protect the data and information stored therein and are normally not accessible from a source outside the eUICC 102. The eUICC 102 can be embedded in a device 114. The device 114 can include a device interface 116 that is used to communicate with the eUICC 102. The device interface 116 can sometimes be referred to as a local profile download (LPD) function or can include a LPD function. Software for operating the device interface 116 can be provided by the device's operating system, not shown.

It should be understood that while the eUICC 102 is normally embedded in a device 114, in a testing environment, the eUICC 102 can take the form of a testing card and element 114 can also be a testing computer that can include or be coupled to a card reader that reads the eUICC 102. In such a case, the device interface 116 can be a software application of the testing computer that simulates the LPD. Hence, in a testing environment, the eUICC 102 and the device interface 116 do not need to be hosted by the same device. Because device 114 may not be a single device in a testing environment, element 114 is represented by dashed lines. However, for simplicity, element 114 is hereafter referred to as device 114 and element 116 is hereafter referred to as the device interface 116.

For provisioning of an eSIM 108, the device 114 can communicate with an eSIM server 118. Under current state of art technology, the eSIM server 118 can include an enhanced subscription manager data preparation (SM-DP+) unit, but those skilled in the art will understand that the eSIM server 118 does not have to include a SM-DP+. The eSIM server 118 can communicate with device 114 via an interface that can sometimes be referred to as an ES8 interface. The ES8 interface can be realized by interface 120 (also called ES9) and interface 122 (also called ES10). A typical provisioning session can include mutual authentication between the eUICC 102 and the eSIM server 118, generation of a shared secret that can include a session key for encryption and decryption of an eSIM package that is transmitted from the eSIM server 118 to the eUICC 102, and installation of the eSIM to the memory of the eUICC 102 by the eUICC OS 104.

Testing according to some embodiments can first include a live test session with a eSIM server 118. At this stage, an eSIM 108 encrypted as part of a bound profile package (BPP) can be transmitted by the eSIM server 118 to the eUICC 102. During the live test session, a piece of test equipment 124 can monitor the communications between the eSIM server 118 and the eUICC 102. The test equipment 124 can be a computer or computers with a database that carries out different executable algorithms or can be a part of software of wireless device that can act as a test server. The test equipment 124 can monitor the communications through interface 120 or interface 122. In a particular case shown in FIG. 1A, the test equipment 124 monitors the communications through interface 120 (e.g. ES9). The test equipment 124 can capture and save certain data transmitted from the eSIM server 118 for later use, which will be discussed in detail below. The data captured can be referred to as a payload 126.

Now referring to FIG. 1B, after the live test session, device 114 can be disconnected from the eSIM server 118. The test equipment 124 can then communicate with the eUICC 102 via interface 120 and/or interface 122. The test equipment 124 can subsequently replay the payload 126 previously captured to test the eUICC OS 104 multiple times. Since an actual eSIM sever is no longer involved in the sessions of replay testing, the testing will not need the eSIM server 118 to provide a new eSIM for each session of testing. Hence, the testing can be conducted multiple times without removing a large number of eSIMs from the inventory of the eSIM server 118.

Overview of Testing Sessions

FIG. 2A illustrates an exemplary general logic flow of a method of conducting test sessions 200 in accordance with some embodiments. At 202, referring to a live test session, the method can include capturing data in a live session. The data being captured can include the payload 126 transmitted from the eSIM server 118. At 204, the method can include replaying the captured data, which can include the captured payload 126, in one or more sessions of replay testing. At 205, the eUICC 102 can provide notifications regarding the installation result to the test equipment 124. The test equipment 124 can then determine, based on the notifications, whether performance of the device 114 and/or performance of the eUICC OS 104 are satisfactory.

Figure 2B:
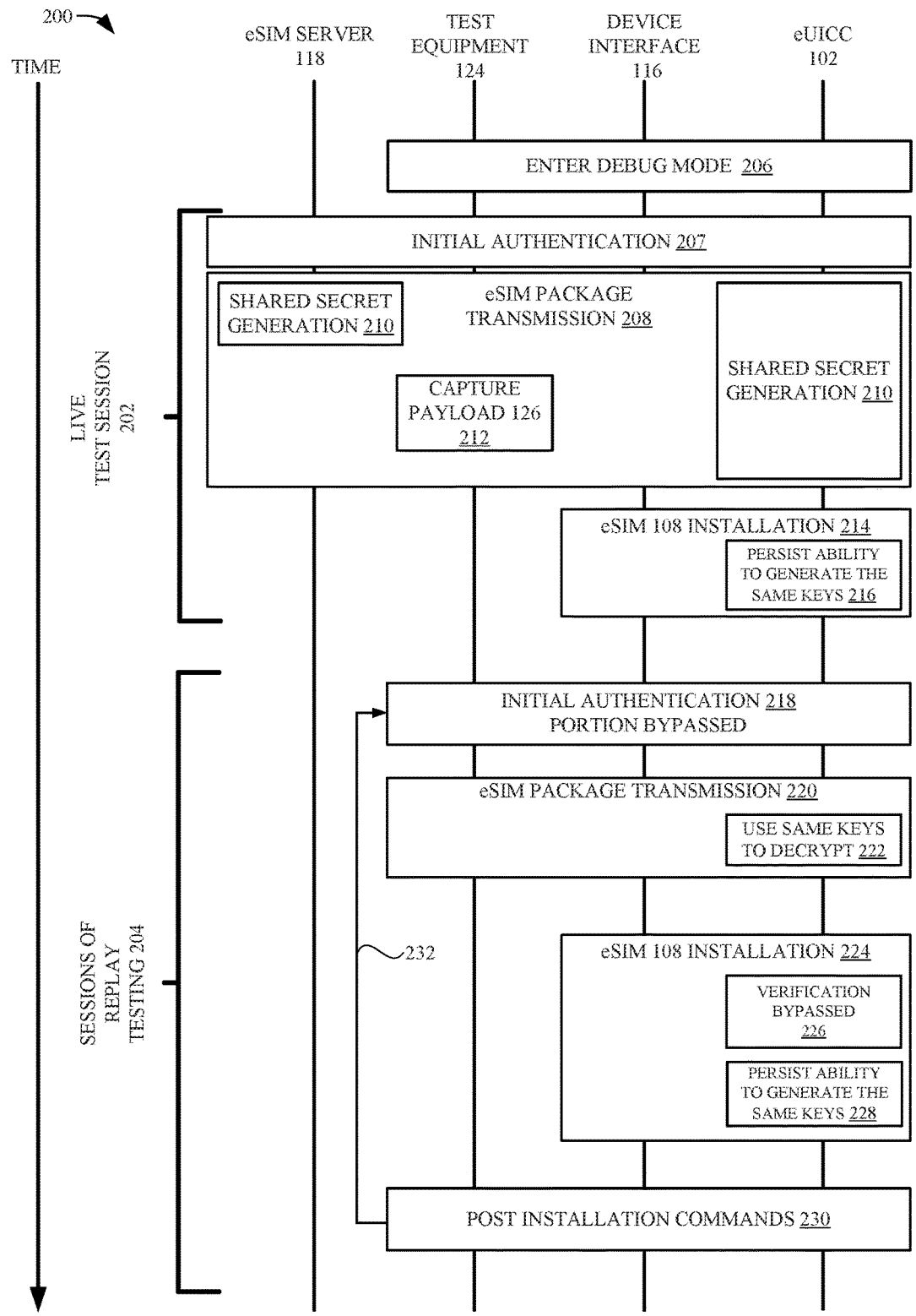
FIG. 2B illustrates an exemplary phase diagram in test sessions in accordance with some embodiments.

FIG. 2B illustrates an exemplary phase diagram of the test sessions 200 in accordance with some embodiments. The test sessions 200 can first include a live test session 202 and subsequent sessions of replay testing 204. The steps in the subsequent sessions of replay testing 204 can be repeated until the test sessions 200 are terminated. In the test sessions 200, the eUICC 102 can operate under a debug mode. In a live test session 202, the eUICC 102 can be in communication with the eSIM server 118 via the device interface 116 and the test equipment 124 can monitor the communication. The relevant configuration of the live test session 202 can be represented by FIG. 1A. In subsequent sessions of replay testing 204, the test equipment 124 can replace the eSIM server 118 and perform the testing with the eUICC 102. The relevant configuration of the sessions of replay testing 204 can be represented by FIG. 1B.

The test sessions 200 can begin at step 206, in which the test equipment 124 can send a debug command to the eUICC 102 to cause the eUICC 102 to enter into a debug mode. It should be noted that the debug command can also be sent from the device interface 116 or from another source. In some embodiments, the debug command can also be sent at a later time. The testing can then continue to a phase 207, which represents an initial authentication between the eUICC 102 and the eSIM server 118. The initial authentication phase 207 can typically include generation of challenges (e.g. a plurality of bits of nonce data for authentication purposes), signing of challenges by recipients (e.g. the eUICC 102 can generate a challenge and the eSIM server 118, as recipient, can sign the challenge, and/or vice versa), verification of signed challenges, and exchange of basic information (firmware version, certificate information, eUICC capabilities). Once the initial authentication is completed, the eUICC 102 and the eSIM server 118 can have an initial level of trust for further exchange of information. During the initial authentication phase 207, the exchange of data can be transmitted through the device interface 116. The test equipment 124 can monitor the communication.

After the initial authentication phase 207, the testing can continue to an eSIM package transmission phase 208. The eSIM package transmission phase 208 can include a step 210 between only the eSIM server 118 and the eUICC 102 to generate a shared secret that can be used to encrypt an eSIM package so that the eSIM package can be transmitted securely. A typical eSIM package can include at least a portion of an eSIM and may additionally and optionally include control reference template, signatures, public keys, and/or other relevant identification, context, and other information.

The shared secret generation step 210 can typically include a generation of a one-time (ephemeral) public-private key pair by the eUICC 102, and a separate generation of a one-time public-private key pair by the eSIM server 118. During the phase 208, the parties can exchange, as needed, public keys. A shared secret can be generated by each party using the public keys and the private key of the eUICC 102 or the eSIM server 118. The shared secret can include a one-time session key that is used to encrypt and decrypt an eSIM package. Under the current state of the art technology, the session key can sometimes be referred to as S-ENC. Further details of the generation of S-ENC at each of the eSIM server 118 and at the eUICC 102 can be found in SGP.22.

Since the session key is protected as a shared secret between the eUICC 102 and the eSIM server 118, the test equipment 124 cannot capture the session key or any private keys even though the test equipment 124 has been monitoring the communication. The embodiments described herein can reduce security concerns even if a malicious party is able to activate the debug mode of the eUICC 102 without authorization. The malicious party will only be able to obtain a payload transmitted from the eSIM server 118, which is encrypted, but will have no access of the session key or the private key of the eUICC 102 to decrypt the secured information in the eSIM package.

After the eSIM server 118 generates the session key using the private key of the eSIM server 118 and the public key of the eUICC 102, the eSIM server 118 can provide an eSIM profile and encrypt the profile with the session key. The encrypted eSIM package can also include other information such as the public key of the eSIM server 118 and the encrypted eSIM package as the payload 126 or a part of the payload 126. During the transmission of the payload 126, the test equipment 124, which has been monitoring the communication, can capture the payload 126 at step 212.

After the eUICC 102 receives the payload 126, the eUICC 102 can use the received public key of the eSIM server 118 and the private key of the eUICC 102 to generate the session key. The eUICC 102 can then recover the eSIM 108 from the encrypted profile (within the payload 126) using the session key.

In an eSIM installation phase 214, the eUICC 102 can work with the device interface 116 to install the eSIM 108. The eSIM installation phase 214 can typically include decryption of the decrypted eSIM profile, reading certificates included in the payload 126, storage of metadata, loading of the eSIM 108 into the memory, and transmission of installation results to the device interface 116. In a normal operation condition (i.e. the eUICC 102 in a non-debug mode) that may include a shipped and sold wireless device, the one-time keys (e.g. the one-time private and public keys of the eUICC 102 and the session key associated with installation of the eSIM) are usually deleted after recovery of the eSIM 108 from the payload 126. In contrast, in the test sessions 200, at step 216 the ability to regenerate the same one-time public-private key pair can be persisted by storing the key generation state in the security domain 110 of the eUICC 102. The stored key generation state is referred to as element 112 in FIGS. 1A and 1B.

The ability to regenerate the same one-time public-private key pair can be persisted by one or more ways. In one case, the eUICC 102 can store the key generate state in the security domain 110. For example, key agreement can be based on methods described in NIST Special Publication 800-56A, Revision 2, "Recommendation for Pair-Wise Key Establishment Schemes using Discrete Logarithm Cryptography," May 2013 (hereinafter "NIST 800-56A"). NIST 800-56A refers to FIPS PUB 186-4 "Digital Signature Standard (DSS)," July 2013 (hereinafter "FIPS 186-4"). NIST 800-56A describes creation of a public key-private key ephemeral key pair using methods of FIPS 186-4. FIPS 186-4 uses a random bit generator (RBG) in the process of generating private keys. For example, FIPS 186-4 Appendix B describes key pair generation using an RBG. During replay testing in debug mode, instead of calling the RBG function and obtaining a new basis for ephemeral key generation, the previous RBG output can be used as the basis of ephemeral key generation. Then, the same ephemeral public key-private key pair is created at the eUICC and can be used to generate the same shared secret (e.g. a session key) to decrypt the captured payload. This previous RBG output is an example of key generation state 112, in some embodiments. In other cases, the eUICC 102 can store the actual values of the public-private key pair and/or the session key in a security domain. The eUICC 102 can then regenerate the keys by retrieving the values of the keys stored in the security domain.

Referring to the subsequent sessions of replay testing 204, the eUICC 102 can be disconnected from the eSIM server 118. The test equipment 124, using the payload 126 (including the encrypted eSIM 108) captured in the live test session 202, can communicate with the eUICC 102 in place of the eSIM server 118. A particular session of replay testing can begin in phase 218, which can be an initial authentication phase similar to the initial authentication phase 207 in the live test session 202. However, some of the steps in this initial authentication phase 218 can be bypassed. For example, as discussed in further detail below, a verification of a first signature of the eSIM server 118, such as a signed eUICC challenge, can be bypassed.

The session of testing 204 can then continue to eSIM package transmission phase 220. Contrary to the eSIM package transmission phase 208 in the live test session 202, in eSIM package transmission phase 220, it is not the eSIM server 118 that transfers a payload because the eSIM server 118 is no longer involved in this test session. Instead, the test equipment 124 can transmit the payload 126 (including again the same eSIM 108). In the eSIM package transmission phase 220, the eUICC 102 does not cooperate with the test equipment 124 generating any new shared secret. Instead, the eUICC 102 uses the previously stored key generation state 112 to regenerate the same public-private key pair and use the keys to derive the same session key to decrypt the encrypted eSIM profile at step 222. This decryption activity is indicated by the "use same keys to decrypt" notation 222 in FIG. 2B.

In eSIM installation phase 224, the eUICC 102 can work with the device interface 116 to install the eSIM encrypted in the payload 126, similar to eSIM installation phase 214 in the live test session 202. However, some of the verification procedures can be bypassed at step 226. In a live installation (i.e. the eUICC 102 being in communication with the eSIM server 118), the eUICC 102 will verify a second signature of the eSIM server 118 in the decrypted eSIM package. On the contrary, at step 226, a verification of a second signature in the eSIM package can be bypassed to allow the eUICC 102 to continue the installation process. In some cases, verification of other information can also be bypassed.

Similar to eSIM installation phase 214, in eSIM installation phase 224 the eUICC 102 can continue to persist the ability to generate the same public-private key pairs at step 228.

In a post-installation commands phase 230, the test equipment 124 and/or the device interface 116 can provide various different post-installation commands to the eUICC 102. Those commands can include listing notifications on the eUICC 102, retrieving notifications from the eUICC 102, removing notifications, deleting the eSIM 108 from the eUICC 102, changing configuration of the device 114, changing configuration of the eUICC 102, starting another session of testing, and/or terminating the debug mode. If the debug mode is not terminated, another session of replay testing 204 can be repeated, as denoted by arrow 232. Test sessions 200 can include numerous sessions of replay testing to stress test the operating system of the eUICC 102, the device interface 116 and the installation procedures. If a command to terminate the debug mode is received, the eUICC 102 can abort the debug mode and erase all of the keys and/or secrets saved.

Detailed Message and Event Sequences

Figure 3A:
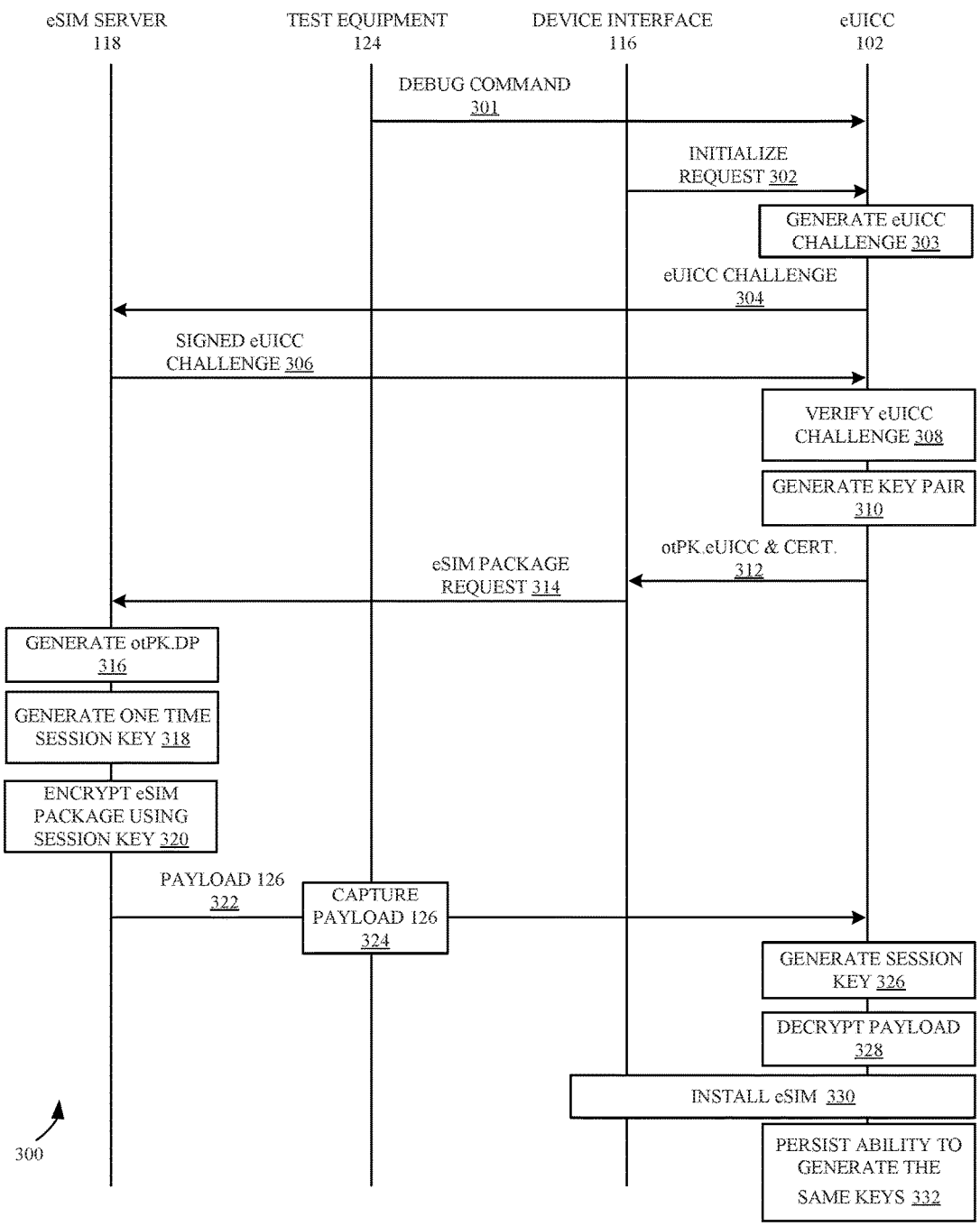
FIGS. 3A and 3B illustrate exemplary detailed message and event sequences of test sessions in accordance with some embodiments.
Figure 3B:
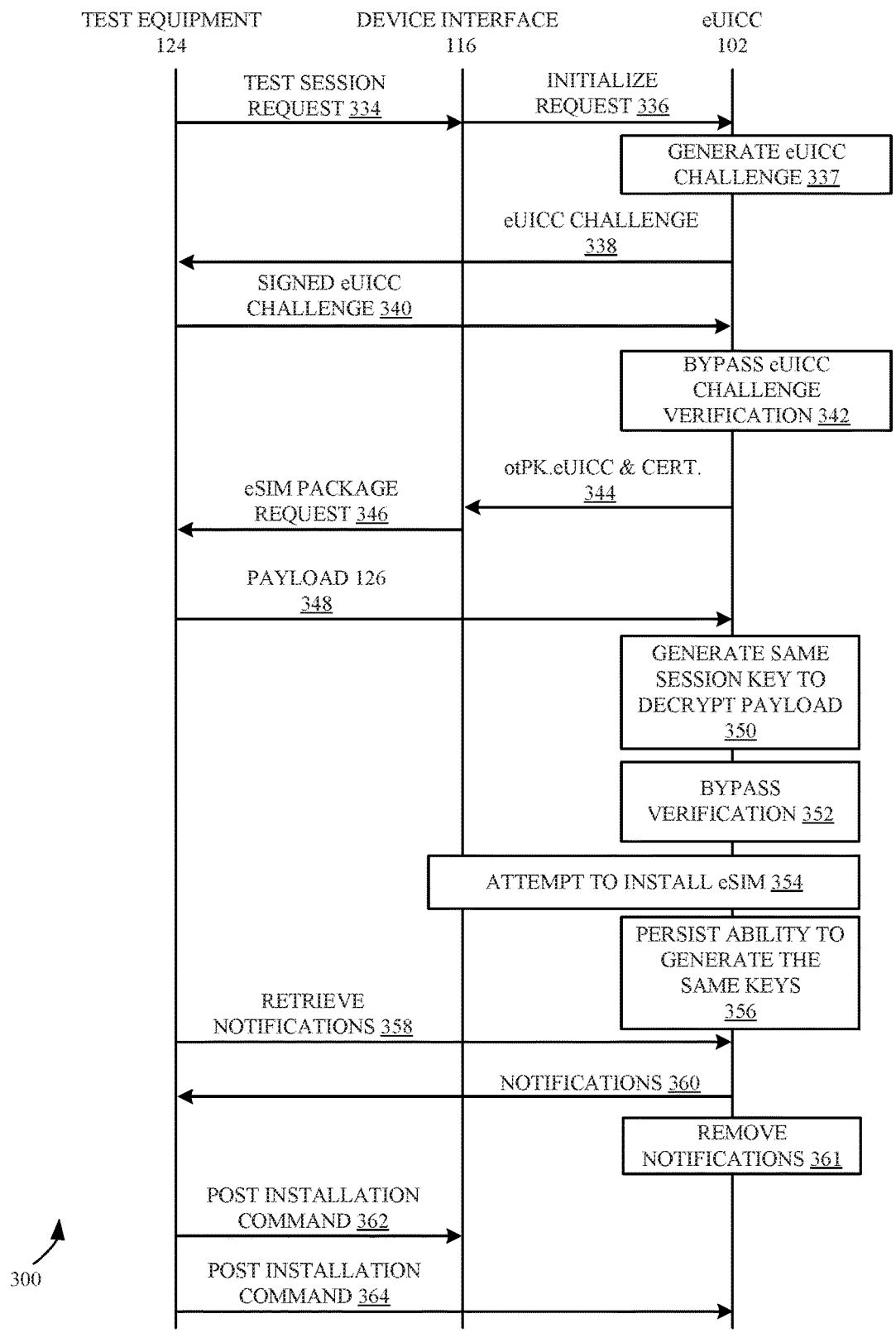

FIGS. 3A and 3B illustrate exemplary detailed message and event sequences 300 of test sessions in accordance with some embodiments. Generally, FIG. 3A can be associated with an initial live test session that can be represented by element 202 in FIG. 2B. FIG. 3B can be associated with subsequent sessions of replay testing that are represented by element 204 in FIG. 2B.

Referring to FIG. 3A, the testing session can begin at step 301 when the eUICC 102 receives a debug mode command from the test equipment 124. In response, the eUICC 102 can activate the debug mode based on a debug mode configuration. In some embodiments, the debug mode command can be sent in a later time. At step 302, the eUICC 102 can receive an initialize request from the device interface 116. The initialize request can signify to the eUICC 102 that a party (which can be a user or test equipment) requests an initialization of an eSIM provisioning session. In some implementations, the initialize request can include a function that can be referred to as ES10b.GetEUICCChallenge. In response, at step 303 the eUICC 102 can randomly generate an eUICC Challenge, which can be a number of bits of nonce data that can be subsequently used to authenticate the eSIM server 118 of this particular provisioning session. At step 304, the eUICC Challenge can be transmitted from the eUICC 102 to the eSIM server 118, along with some basic information of eUICC 102 (e.g. firmware version, certificate information, eUICC capabilities).

It should be noted that, for the communication with the eUICC 102, generally data would reach the device interface 116 first. However, for simplicity, in FIGS. 3A and 3B, the message exchanges are often shown as direct arrows between the sender and the intended recipient even though some of the messages may reach an intermediary first before the messages are re-transmitted or the pertinent information forwarded.

After the eSIM server 118 receives the eUICC Challenge, the eSIM server 118 can sign the eUICC Challenge and compute a first signature that can include the eUICC Challenge. In some cases, the eSIM server 118 can also randomly generate its own eSIM server Challenge nonce value to be included in the first signature. In some implementations, the first signature can be called dpSigned1. At step 306, the eSIM server 118 can transmit the first signature having the eUICC Challenge along with other information certificates of the eSIM server 118 to the eUICC 102. In some cases, the test equipment 124 can capture this signature. At step 308, the eUICC 102 can verify the eUICC Challenge in the signature. Once the eUICC Challenge is verified, an initial authentication can be completed.

The eUICC 102 and the eSIM server 118 will then securely exchange data in order to generate a shared secret between the eUICC 102 and the eSIM server 118. At step 310, a debug command or configuration can cause the eUICC 102 to generate a pair of one-time keys that include a public key (otPK.eUICC) and a private key (otSK.eUICC). The generation of the key pair can include a random component. The eUICC 102 can generate a signature using the private key. In some implementations, this signature can be called euiccSigned1. The private key (otSK.eUICC) is kept at the eUICC 102 as the secret of the eUICC 102. At step 312, the eUICC 102 can transmit the signature along with the public key (otPK.eUICC) and other information such as certificates of the eUICC 102 to the device interface 116. Upon receiving the signature from the eUICC 102, the device interface 116 at step 314 can generate an eSIM package request that requests the eSIM server 118 to provide an eSIM. In some implementations, the request can be called ES9+.GetBoundPorfilePackage. The device interface 116 can also transmit the signature of the eUICC 102 to the eSIM server 118.

At step 316, the eSIM server 118 can verify the signature of the eUICC 102 and other information. After successful authentication, the eSIM server 118 can generate a pair of one-time keys that include a public key (otPK.DP) and a private key (otSK.DP). At step 318, based on the public key of the eUICC 102 (otPK.eUICC) and the private key of eSIM server (otPK.DP), the eSIM server 118 can also generate a one-time session key as a shared secret shared only between the eSIM server 118 and the eUICC 102. The session key can sometimes be referred to as S-ENC. At step 320, the eSIM server 118 can generate a second signature that can include the public key (otPK.eUICC) of the eUICC 102 and other information. In some implementations, this second signature can be called smdpSigned2. Then, the eSIM server 118 can generate an eSIM package that can include the eSIM 108, the second signature, and the public key (otPK.DP) of the eSIM server 118 and encrypt the eSIM package using the session key.

At step 322, the eSIM server 118 can transmit the payload 126 that can include the encrypted eSIM package based on the eSIM 108 to the eUICC 102. At step 324, the test equipment 124, which has been monitoring the communication between the eUICC 102 and the eSIM server 118, can capture the payload 126 and save the payload 126 for subsequent use. Once the payload 126 reaches the eUICC 102, the eUICC 102 can generate the session key at step 326 based on the public key (otPK.DP) of the eSIM server 118 and the private key (otSK.eUICC) of the eUICC 102. The session key generated is the same session key that is generated by eSIM server at step 318. The session key can be protected and kept as a shared secret between the eUICC 102 and the eSIM server 118.

At step 328, the eUICC 102 can use the session key to decrypt the encrypted eSIM profile (eSIM 108). At step 330, the device interface 116 can send a request for the eUICC 102 to install the recovered eSIM profile data. In some implementations, the request can be called ES10b.LoadBoundProfilePackage. The eUICC 102 can then save or send notifications regarding the success or failure of the installation of the eSIM 108 and/or regarding the entire provisioning process. The eUICC 102 can also delete the eSIM 108 after notifications are sent to get prepared for the next test session. Based on a debug mode configuration, at step 332, the ability to generate the same public-private key pair is persisted. For example, the key generation state can be stored in a security domain. In some cases, the public-private key pair of the eUICC 102 (i.e. otPK.eUICC and otSK.eUICC) can be persisted and stored in the security domain 110 of the eUICC 102. The information that is not persisted will be deleted after the test session. It should be noted that, if the eUICC 102 is not in the debug mode (i.e. in a normal operation), the key generation information, the one-time key pair (otPK.eUICC and otSK.eUICC) and the one-time session key will normally be deleted after the provisioning session is completed. An initial session of live test session is completed after step 332 and the testing can continue with the steps described in FIG. 3B.

Referring to FIG. 3B, based on a debug configuration, testing can be continued using the previously stored key generation state 112. Instead of connecting to an eSIM server, the eUICC 102 can be connected with the test equipment 124. A new session of testing can begin when the test equipment 124 sends a test request to the device interface 116 at step 334. In turn, at step 336, the device interface 116 can send an initialize request to the eUICC 102 to request for an initialization of a provisioning session. In some implementation, the initialize request can include a function that can be called ES10b.GetUICCChallenge.

In response to the initialization request, the eUICC 102 at step 337, similar to a live test session, can randomly generate an eUICC Challenge that can be used for the authentication of this provisioning session. At step 338, the eUICC 102 can send the eUICC Challenge to the test equipment 124. At step 340, the test equipment 124 can sign the eUICC Challenge and send the signed eUICC Challenge back to the eUICC 102. Alternatively, if at step 306 the test equipment 124 has captured the first signature from the live eSIM server in the live test session, the test equipment 124 can send the captured first signature to the eUICC 102. At step 342, a debug command or configuration can cause the eUICC 102 to bypass the verification of a first signature received by the eUICC 102, such as a signature on the eUICC Challenge. In other words, the eUICC 102 can regard an initial connection between the eUICC 102 and the test equipment 124 as authenticated regardless of whether the eUICC Challenge transmitted by the test equipment 124 matches the eUICC Challenge generated at step 337 and/or regardless of whether the signature and/or the certificate of the test equipment 124 can be verified.

In a live session installation, after the completion of an initial authentication, the eUICC 102 can normally attempt to work with an eSIM server to generate a shared secret. In contrast, in a replay test session where the eUICC 102 is working with the test equipment 124, at step 344 the eUICC 102 uses the stored key generation state 112 to regenerate the pair of public-private key that is the same as the previous live test session. Alternatively, in some embodiments the eUICC 102 can retrieve the pair of same public-private key if the key pair is previously stored. Then the eUICC 102 can send the same eUICC public key (otPK.eUICC). The eUICC 102 can generate a signature using the same private key and can transmit the signature and the same public key to the device interface 116. Upon receiving the signature from the eUICC 102, the device interface 116 at step 346 can generate an eSIM package request and send the request and the signature along with the public key to the test equipment 124. In response, at step 348 the test equipment 124 can transmit the (previously captured) payload 126, including the eSIM 108 data, to the eUICC 102.

At step 350, the eUICC 102 can receive the same eSIM server public key because this eSIM server public key is included in the captured payload 126. The eUICC 102 then use the same eUICC private key and the eSIM server public key to generate the same session key, which can be used to decrypt the encrypted eSIM package included in the payload 126 and recover the eSIM 108. The session key generated will be the same as the one in the live test session and can decrypt the encrypted eSIM profile because the payload 126 sent from the test equipment 124 is the same payload 126 previously sent from the eSIM server 118 at step 322.

In a live test session, the decrypted eSIM package can contain one or more signatures. For example, the decrypted eSIM package can contain a second signature, e.g., smdp-Signed2. The eUICC 102 can verify the second signature in the decrypted eSIM package to make sure the eSIM package is from the eSIM server 118. In contrast, at step 352, a debug command or configuration can cause the eUICC 102 to bypass a verification of a second signature. Similarly, other signatures and certificates contained in the payload 126 may also not match the current replay session. Verification of those signatures can also be bypassed.

After the eSIM package is decrypted, the eUICC 102 can work with the device interface 116 to try to install the eSIM 108 at step 354. The ability to generate the same key pair can again be persisted at step 356 by storing the key generation state and/or by storing the key pair. After the installation attempt, at step 358, the test equipment 124 and/or the device interface 116 can send commands to retrieve notifications from the eUICC 102 that can contain the installation result. In some implementations, those commands can include functions that can be called ES10b.ListNotificaiton and ES10b.RetrieveNotificationsList. Each notification can include a unique sequence number that indicates the kind of notification and the type of event. The eUICC 102 at step 360 can provide notifications to the device interface 116 and/or the test equipment 124. Normally, after the notifications are sent, at step 361, the eUICC 102 can receive another command to clear the notifications stored, which, in some implementations, can be called ES10b.RemoveNotificationList. In some cases, the notification protocol of the eUICC 102 can also be stress tested by not having the eUICC 102 to send or clear the notifications stored. Such testing of notification protocol will be discussed in further detail below.

At step 362, the test equipment 124 can provide post-installation commands to the device interface 116. At step 364, test equipment can provide post-installation commands to the eUICC 102. The post-installation commands can include deleting the installed eSIM, changing configuration of the device 114, changing configuration of the eUICC 102, starting another session of testing, and/or terminating the debug mode.

By changing the configuration of the device 114 and/or changing configuration of the eUICC 102, the proper functioning of both the device interface 116 and the eUICC 102 can be tested through multiple replay test sessions. For example, in one test session, the eUICC 102 can be set to a state that allows an installation of an eSIM. Hence, the proper installation of eSIM can be tested. In another test session, the eUICC 102 can be set to a state that should reject repeat installation of the same eSIM. For example, testing can be performed with an eSIM from a previous test session intentionally not deleted from the eUICC 102. Hence, an intended feature of the eUICC 102 that can reject the attempted repeat installation of an eSIM can be tested. Other intended features of the eUICC 102 can also be tested in a similar manner by changing the configuration of the device 114 and/or eUICC 102 in between sessions of replay testing. In yet another test session, testing can be performed with no notification being retrieved from the eUICC 102. Hence, the notification protocol of the eUICC 102 can be tested, which will be discussed in detail below.

The steps in FIG. 3B can be repeated for another session of replay testing until the debug mode of the eUICC 102 is terminated.

EUICC Logic Flow

Figure 4:
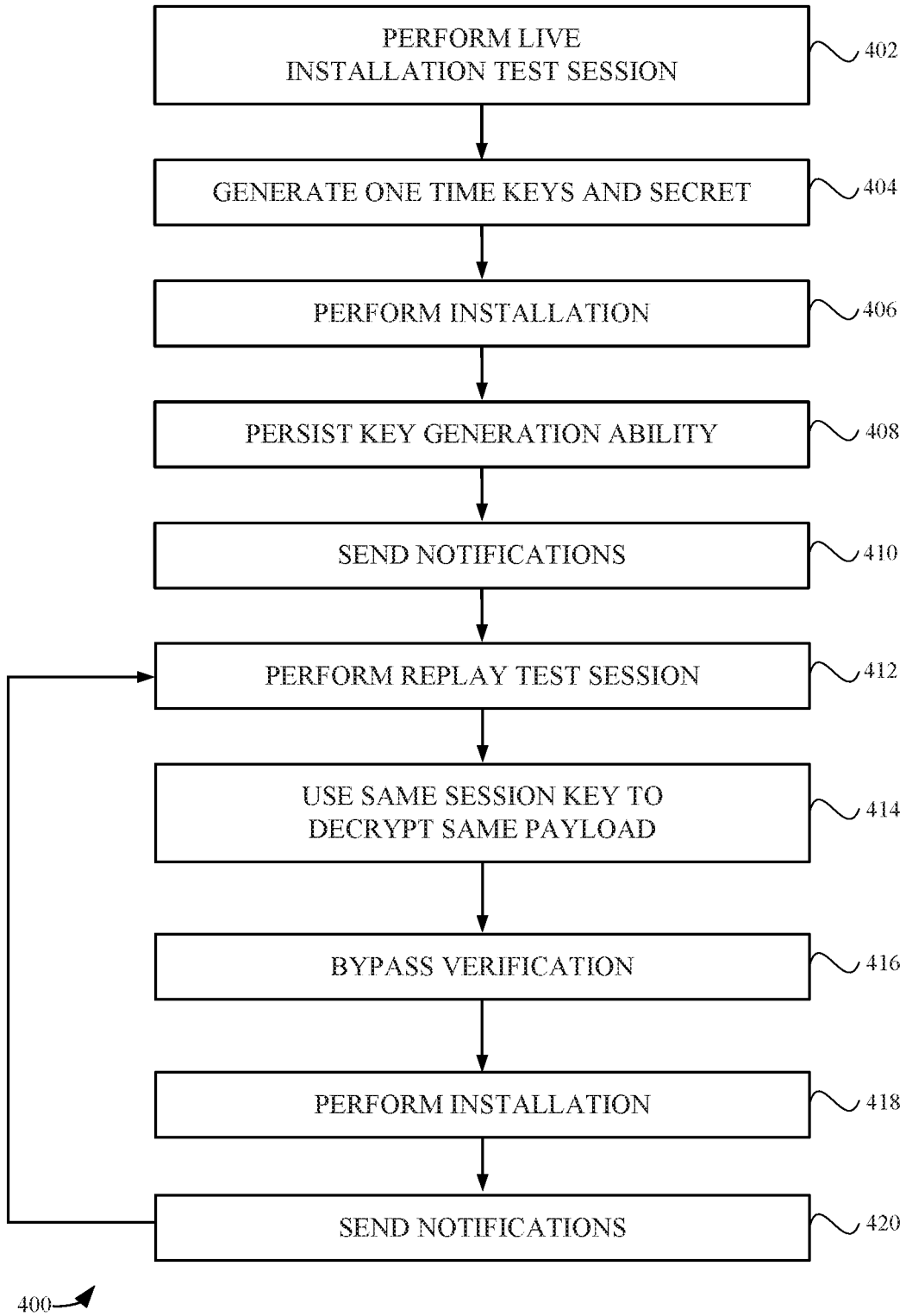
FIG. 4 illustrates an exemplary logic flow of an eUICC in accordance with some embodiments.

FIG. 4 illustrates a general logic flow 400 of the eUICC 102 in a debug mode in accordance with some embodiments. At step 402, the eUICC 102 can begin to perform a live test session. At step 404, the eUICC 102 can generate a one-time pair of public and private keys. At step 406, the eUICC 102 can perform an installation of an eSIM by decrypting an incoming eSIM package based on a shared secret generated by the one-time key pair. At step 408, the eUICC 102 can persist the ability to generate the same key pair, such as by storing the key generation state, the one-time key pair and/or the shared secret for subsequent use. At step 410, the eUICC 102 can provide notifications on the installation results to the device. The live test session is then largely completed and the eUICC 102 can delete the installed eSIM to get prepared for the next test session.

At step 412, the eUICC 102 can perform a replay test session. At step 414, the eUICC 102 can receive the same payload 126 that is previously captured in the live test session. The eUICC 102 can use the same eUICC private key to regenerate the same session key, which can be used to decrypt the encrypted eSIM package. At step 416, the eUICC 102 can bypass the verification of the eSIM package by bypassing the verification of a signature in the eSIM package. At step 418, the eUICC 102 can perform installation of the eSIM. At step 420, the eUICC 102 can provide notifications on the installation results to the device. A replay test session is then largely completed and the eUICC 102 can delete the installed eSIM to get prepared for the next replay test session. A replay test session can be repeated until the debug mode is terminated.

Figure 5:
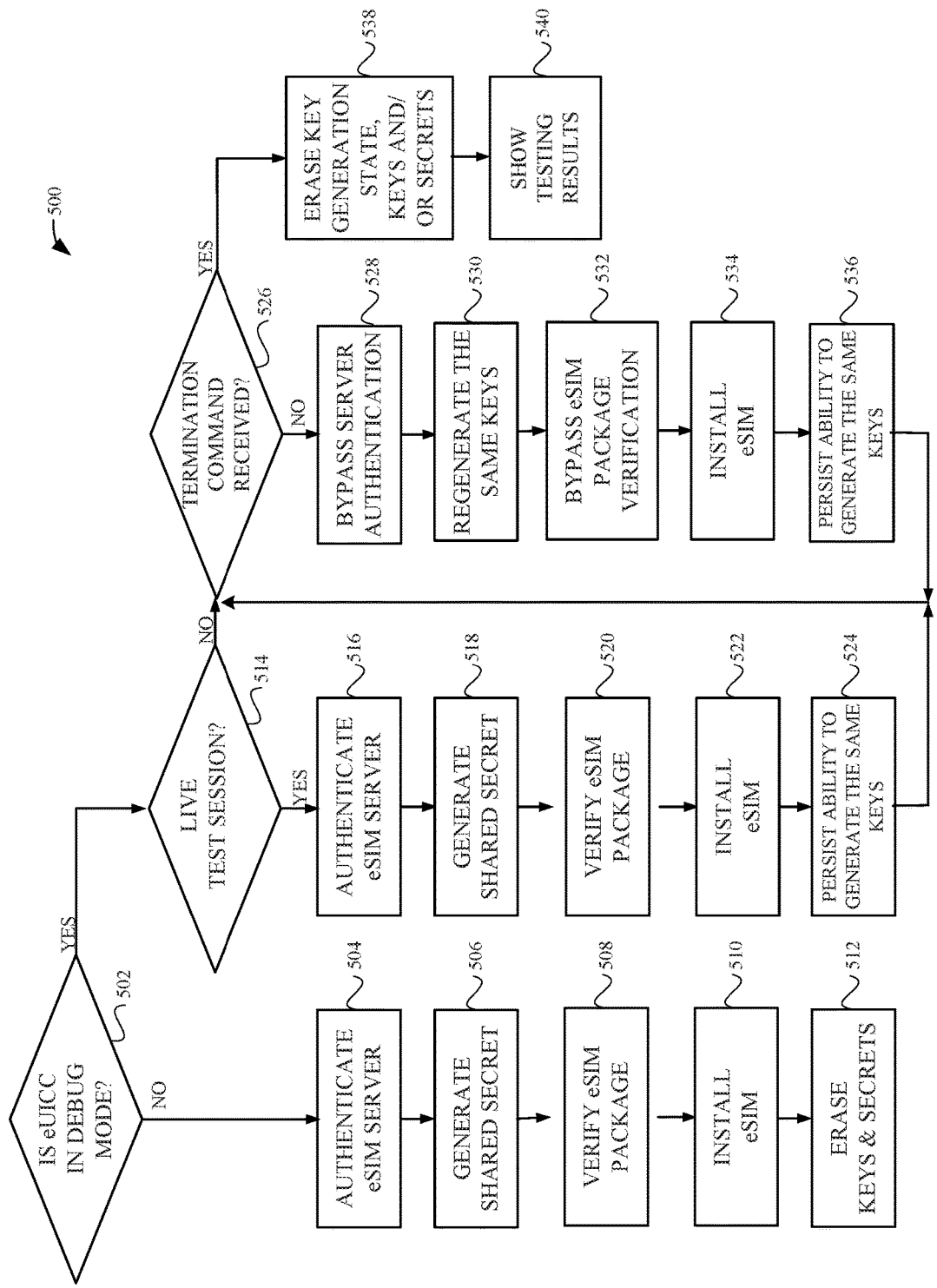
FIG. 5 illustrates another exemplary logic flow of an eUICC in accordance with some embodiments.

FIG. 5 illustrates a logic flow 500 of the eUICC 102 that has a normal operation mode and a debug mode in accordance with some embodiments. FIG. 5 illustrates the differences among (i) the normal operation mode, (ii) a live test session in the debug mode, and (iii) a replay session in the debug mode. The eUICC 102 in accordance with some embodiments can include both the capability to operate the normal operation mode and debug mode. In other cases, the eUICC 102 can have the normal operation mode activated but have the debug mode de-activated when the device 114 hosting the eUICC 102 is shipped. The debug mode can be activated in a manufacturing or repair condition to allow testing and quality control of the eUICC OS 104 and the device interface 116.

The logic flow 500 can begin at 502, which can be a decision stage that the eUICC 102 determines whether a debug mode is activated. The eUICC 102 can enter the debug mode when a debug command is received by the eUICC 102. Referring first to the case when the debug mode is not activated, the eUICC 102 can enter a normal operation for a provisioning session. A normal operation can generally be associated with the normal operating condition of the eUICC 102. For example, the normal operation can be the usual operation of the eUICC 102 when the eUICC 102 is embedded in a device 114 that is sold or being sold to an end user at a retail store. A normal eSIM provisioning session can be associated with situations, for example, when an end user first purchases a wireless device and is trying to obtain cellular network access from a mobile network operator (MNO) or when an end user wants to switch to a new MNO for their wireless device.

A normal eSIM provisioning session can begin at an initial authentication phase. At step 504, the eUICC 102 can receive a first signature from an eSIM server and can perform a server authentication. At step 506, the eUICC 102 can work with the eSIM server to generate a shared secret. The shared secret can include a one-time session key. At step 508, the eUICC 102 can receive an encrypted eSIM package from the eSIM server and can use the session key to decrypt the encrypted eSIM package. The eUICC 102 can then verify the eSIM package to authenticate the sender, i.e., verify that the source is the eSIM server. At step 510, after a second signature included with the eSIM package is verified, the eUICC 102 can install the eSIM. At step 512, the eUICC 102 can erase its key generation state, its one-time public-private key pair and the corresponding shared secret. The eUICC 102 can also provide notifications of the installation results to the device and/or to the eSIM server. If any of the authentication and/or verification steps fail, the eUICC 102 can reject the eSIM package and the installation will fail. If the installation succeeds, the normal eSIM provisioning session will then be completed and the device 114 will be ready for use with a MNO that provides cellular network service to the device 114.

Referring back to decision stage 502, if the eUICC 102 is in a debug mode, the eUICC 102 can enter another decision stage 514 that determines whether a test session for the debug mode is a live test session. The first session of a debug mode can normally be a live test session. If a test session is not a live test session, it can be a replay test session.

A live test session can begin at an initial authentication phase. At step 516, similar to step 504, the eUICC 102 can receive a first signature from an eSIM server 118 and can perform a server authentication. At step 518, similar to step 506, the eUICC 102 can work with the eSIM server 118 to generate a shared secret. At step 520, similar to step 508, the eUICC 102 can receive an encrypted eSIM package from the eSIM server 118 and can use the shared secret to decrypt the encrypted eSIM package. Then the eUICC 102 can verify a second signature included with the eSIM package. At step 522, similar to step 510, after the eSIM package is verified, the eUICC 102 can install the eSIM. However, at step 524, in contrast to step 512 that erases the one-time public-private key pair and the shared secret, the eUICC 102 can persist the ability to generate the same key pair by storing the key generation state or the one-time public-private key pair. The eUICC 102 can also provide notifications of the installation results to the device and/or to the eSIM server 118. The live test session is then completed.

After the live test session, the debug mode can continue to a replay test session at decision stage 526, which can determine whether a command for terminating the debug mode is received. It should be noted that although decision stage 526 is shown to be located between 514 and 528, in some embodiments a termination command can be sent at anytime during the debug mode to terminate the testing.

If no termination command is received, the debug mode can continue to a replay test session, which can begin at step 528. Similar to a live test session, a replay test session can begin at an initial authentication phase. However, unlike step 516, server authentication can be bypassed at step 528. At step 530, unlike step 518 that generates a shared secret, the eUICC 102 can regenerate the same public-private key pair using the key generation state previously stored at step 524. At step 532, the eUICC 102 can receive an encrypted eSIM package from test equipment and can use the same keys to derive the same session key to decrypt the package. However, unlike step 520, the eUICC 102 can bypass the verification of a signature included with the eSIM package. At step 534, the eUICC 102 can attempt to install the eSIM. At step 536, similar to step 524, the eUICC 102 can persist the ability to generate the same key pair by storing the key generation state or the one-time public-private key pair. The eUICC 102 can also provide notifications of the installation results to the device and/or to the eSIM server. A replay test session is then completed. After a replay test session is completed, the testing can return to decision stage 526 to determine whether another session of replay testing should be started. The replay test sessions can be repeated multiple times for one debug mode testing.

Referring back to decision stage 526, if a termination command is received, the eUICC 102 at step 538 can erase the key generation state, the stored keys and/or secrets. At step 540, the eUICC 102 can provide testing results to the device interface 116 and/or the test equipment 124.

Stress Testing of Notification Protocol of eUICC

In a normal operation, an eUICC may send a notification to the eSIM server indicating whether an eSIM is successfully installed at the eUICC. A failure to send such notification may result in the wireless device not being able to connect to a cellular network. Hence, the notification protocol can be important to the proper functioning of an eUICC.

Figure 6:
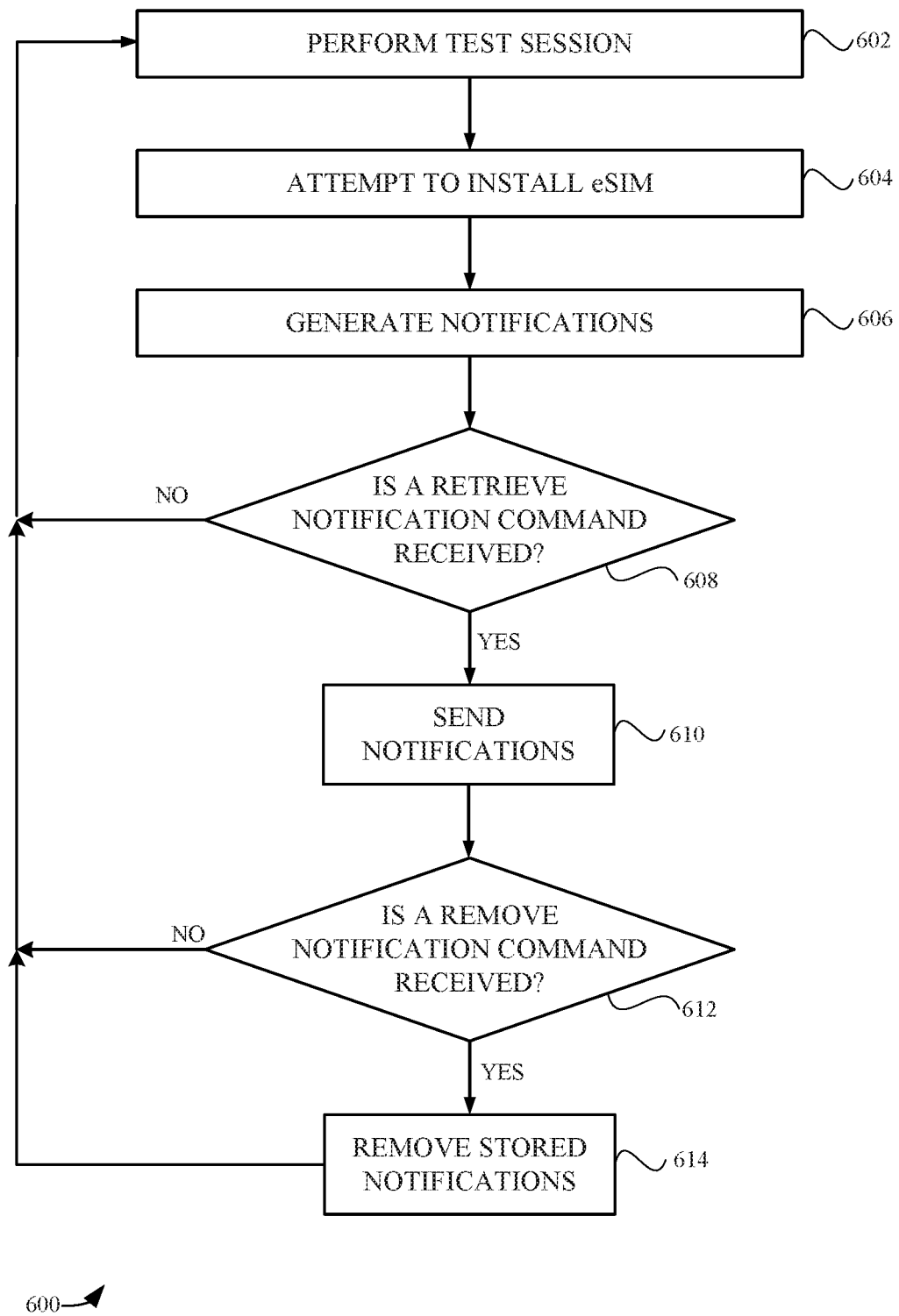
FIG. 6 illustrates an exemplary logic flow of testing of the notification protocol of an eUICC in accordance with some embodiments.

FIG. 6 illustrates an exemplary logic flow 600 of stress testing of the notification protocol of the eUICC 102. The testing of the notification protocol of the eUICC 102 can begin at step 602, where the eUICC 102 in a debug mode can perform a test session. At step 604, the eUICC 102 can attempt to install the eSIM transmitted during the test session to the eUICC 102. At step 606, based on the installation results, the eUICC 102 can generate one or more notifications, each of which can have a unique sequence number that indicates the kind of notification and the type of event. The notifications can be saved in a memory of the eUICC 102. At decision stage 608, the eUICC 102 can await a command from either the device interface 116 or the test equipment 124 for retrieving the notifications. In some implementations, a retrieve-notification command can be called ES10b.RetrieveNotificationsList. If a retrieve-notification command is received, at step 610 the eUICC 102 can send the notifications to the device. After sending the notification, at decision stage 612, the eUICC 102 can receive a command for removing the notifications stored. In some implementations, a remove-notification command can be called ES10b.RemoveNotificationsList. If a remove-notification command is received, at step 614 the eUICC 102 can remove the stored notifications. The eUICC 102 can then perform another test session. If a retrieve-notification command is not received at decision stage 608, the eUICC 102 can perform another test session without sending a notification. Likewise, if a remove-notification command is not received at decision stage 612, the eUICC 102 can perform another test session without deleting any notifications stored. The stored notification can pile up in the memory until a remove-notification command is received.

A stress testing of the notification protocol of the eUICC 102 can be performed using logic flow 600. An eUICC may have a limit on the maximum numbers of notifications that the eUICC can store. In a normal eSIM provisioning session, an eUICC usually will generate only a handful of notifications and the limit will generally not be reached. However, in some rare scenarios an eUICC may generate a large number of notifications. Hence, it is important to stress test the notification protocol to ensure the protocol will properly function when there are a large number of notifications stored in the eUICC. In one case, the eUICC 102 can perform hundreds of sessions of replay testing. In each session, a remove-notification command is intentionally not sent to the eUICC 102. For example, the test equipment 124 can refrain from sending such a command. Hence, the eUICC 102 can store a large number of notifications without deleting the notifications at a memory of the eUICC 102. In one subsequent test session, a retrieve-notification can then be sent to the eUICC 102 at 608 to test whether the transmission of notifications can still function properly. In another case, a remove-notification can also be sent to the eUICC 102 at 612 to test whether the removal of notifications can still function properly. For example, a remove-notification can be sent only after the eUICC 102 has reached its notification limit to stress test whether the remove-notification can still function properly at this stage. Hence, the proper transmission of notifications at step 610 and the proper removal of notifications at step 614 can thus be tested when a large number of notifications are stored in the eUICC 102. This testing can ensure that the notification protocol of the eUICC 102 will function properly in any situations.

EUICC Algorithm Protocols

Figure 7:
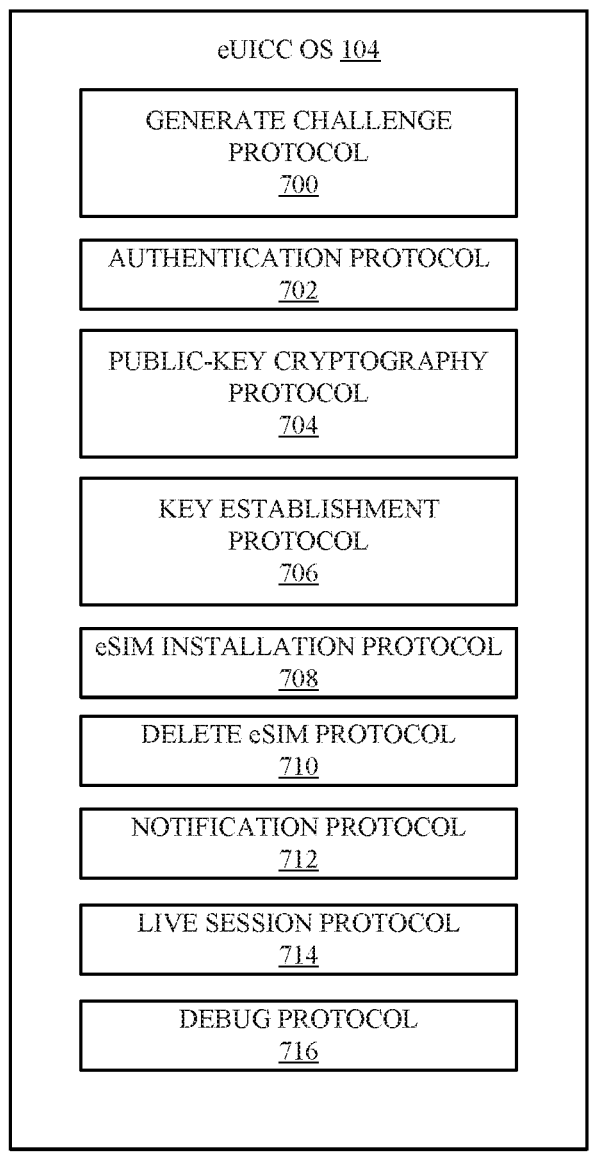
FIG. 7 illustrates different algorithm protocols executable by an exemplary eUICC operating system in accordance with some embodiments.

FIG. 7 illustrates different algorithm protocols executable by a processor of the eUICC OS 104. It should be understood that each protocol can be an algorithm function or a combination of functions that allow the eUICC OS 104 to perform certain actions or commands.

The eUICC OS 104 can include a generate challenge protocol 700, which can randomly generate an eUICC Challenge when the protocol is called. An eUICC Challenge can be a number of bits of nonce data that is randomly generated in each provisioning session and can be used throughout the provisioning session for identification and authentication purposes.

An authentication protocol 702 can include one or more functions that verify different incoming data or requests for connection. Different stages in a provisioning session can include different authentication procedures. An authentication procedure can include verification of one or more signatures, certificates, tokens, and/or codes. In one case, for example, the eUICC 102 can authenticate the eSIM server 118 by verifying that the eUICC Challenge was signed by the eSIM server 118. In another case, the eUICC 102 can verify a signature received with an eSIM package based on a public key of the eSIM server 118.

A public-key cryptography protocol 704 can include one or more functions that allow the eUICC 102 and an eSIM server to establish trust using public-key infrastructure (PKI) techniques. Public-key cryptography protocol 704 can also establish various security sessions with an eSIM server 118 such as establishing a transport layer security (TLS) session.

A key establishment protocol 706 can establish a shared secret with an eSIM server. Key establishment protocol 706 can generate one-time public-private key pairs for data encryption purposes. In one case, the generation of a key pair can be based on elliptic curve parameters and can include a random component. Key establishment protocol 706 can exchange public keys with an eSIM server in order to generate a one-time session key as a shared secret. For example, the eUICC 102 can transmit its own public key to the eSIM server and, in return, receive a public key generated by eSIM server. Based on the exchanged public keys and unshared private keys, a shared secret, which can include the one time session key, can be generated by each party.

An eSIM installation protocol 708 can include functions that decrypt an incoming encrypted eSIM package, usually based on the one time session key held as a shared secret. Depending on the session in which the eUICC 102 is operating, the eSIM installation protocol 708 can call part or all of the authentication protocol 702 to verify the signature received with the eSIM package. In some cases when a debug mode is activated, such authentication steps can be bypassed. The eSIM Installation protocol 708 can also install the decrypted profile (i.e. eSIM) into the memory of the eUICC 102.

A delete eSIM protocol 710 can be a function that deletes an eSIM stored in the memory of the eUICC 102 when the function is called.

A notification protocol 712 can be a function that provides status of the eUICC 102 and records events of the eUICC 102. For example, the notification protocol can be used to record the events associated with an eSIM provisioning including whether an installation of the eSIM is successful and whether any error is generated during the provisioning session. Each notification can be associated with a unique sequence that indicates the kind of notification and the type of event. The notification protocol 712 can include listing notifications on the eUICC 102, transmitting notifications, and removing notifications. The notification protocol 712 can be used with both a live session and a debug mode.

A live session protocol 714 can include multiple protocols mentioned herein that allow the eUICC 102 to be provisioned with an actual eSIM. Live session protocol 714 can be associated with the normal operation of the eUICC 102 when a wireless device is sold to a user. Live session protocol 714 can also be used in the live test session in a debug mode.

A debug protocol 716 can be associated with testing of the eUICC OS and the installation of eSIM. Debug protocol 716 can activate a debug mode. Similar to the live session protocol 714, debug protocol 716 can also include multiple protocols mentioned herein such that an eSIM package can be decrypted and installed into the eUICC 102. However, Debug protocol 716 can modify some of the other protocols. For example, when a debug mode is activated, the eUICC 102 can be configured to repeatedly store the key generation state and repeatedly regenerate the same public-private key pair in order to regenerate the same session key to attempt to install any incoming encrypted eSIM packages until the debug mode is terminated. Also, when a debug mode is activated, the eUICC 102 can bypass a verification of the signature of eUICC Challenge that can be normally carried by part of the authentication protocol 702. The eUICC 102 can provide notification based on a result of each installation attempt in the debug mode.

Test Equipment Logic Flow

Figure 8:
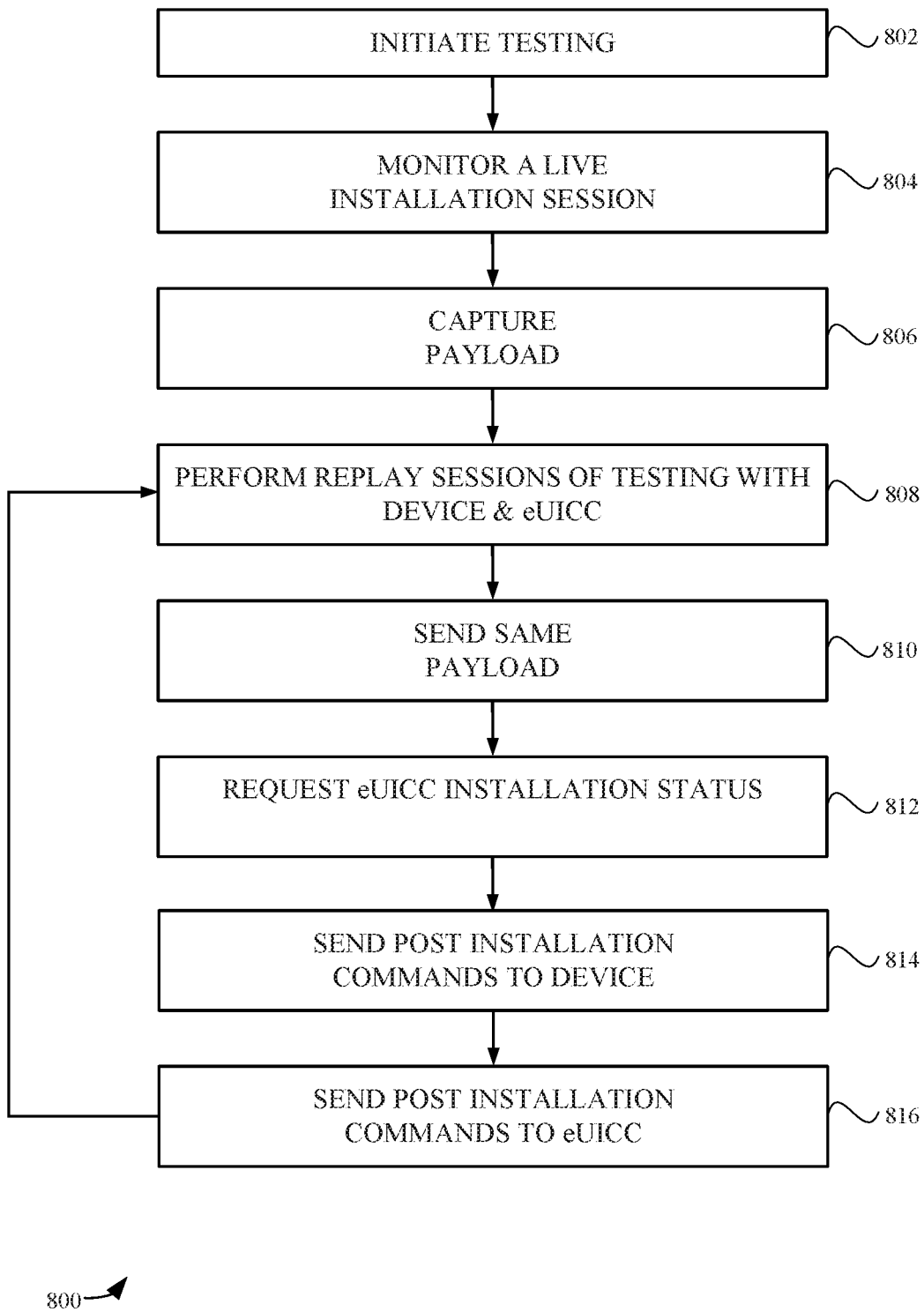
FIG. 8 illustrates an exemplary logic flow of test equipment in accordance with some embodiments.

FIG. 8 illustrates test equipment logic flow 800 for testing sessions with the eUICC 102 according to some embodiments. At step 802, test equipment 124 can initialize the testing and can cause the eUICC 102 to enter a debug mode by sending a debug command to the eUICC 102. At step 804, test equipment 124 can monitor a live test session between the eUICC 102 and a live eSIM server 118. At step 806, when the eSIM server 118 transmits a payload that includes an encrypted eSIM package, test equipment 124 can capture the payload. At step 808, test equipment 124 can replace the eSIM server 118 to conduct subsequent replay test sessions with device 114 that hosts the eUICC 102. At step 810, in response to a request from device 114 for an eSIM package, test equipment 124 can send the same payload that is previously captured at step 806 to the eUICC 102. At step 812, test equipment 124 can request eUICC installation status from the eUICC 102 to determine whether a test installation is completed as intended. At step 814, test equipment 124 can send post-installation commands to the device. At step 816, test equipment 124 can also send post-installation commands to the eUICC 102. Test equipment 124 can repeat steps 808 to 816 with the eUICC 102 for another session of replay testing.

Exemplary Testing Using Static Data

Figure 9:
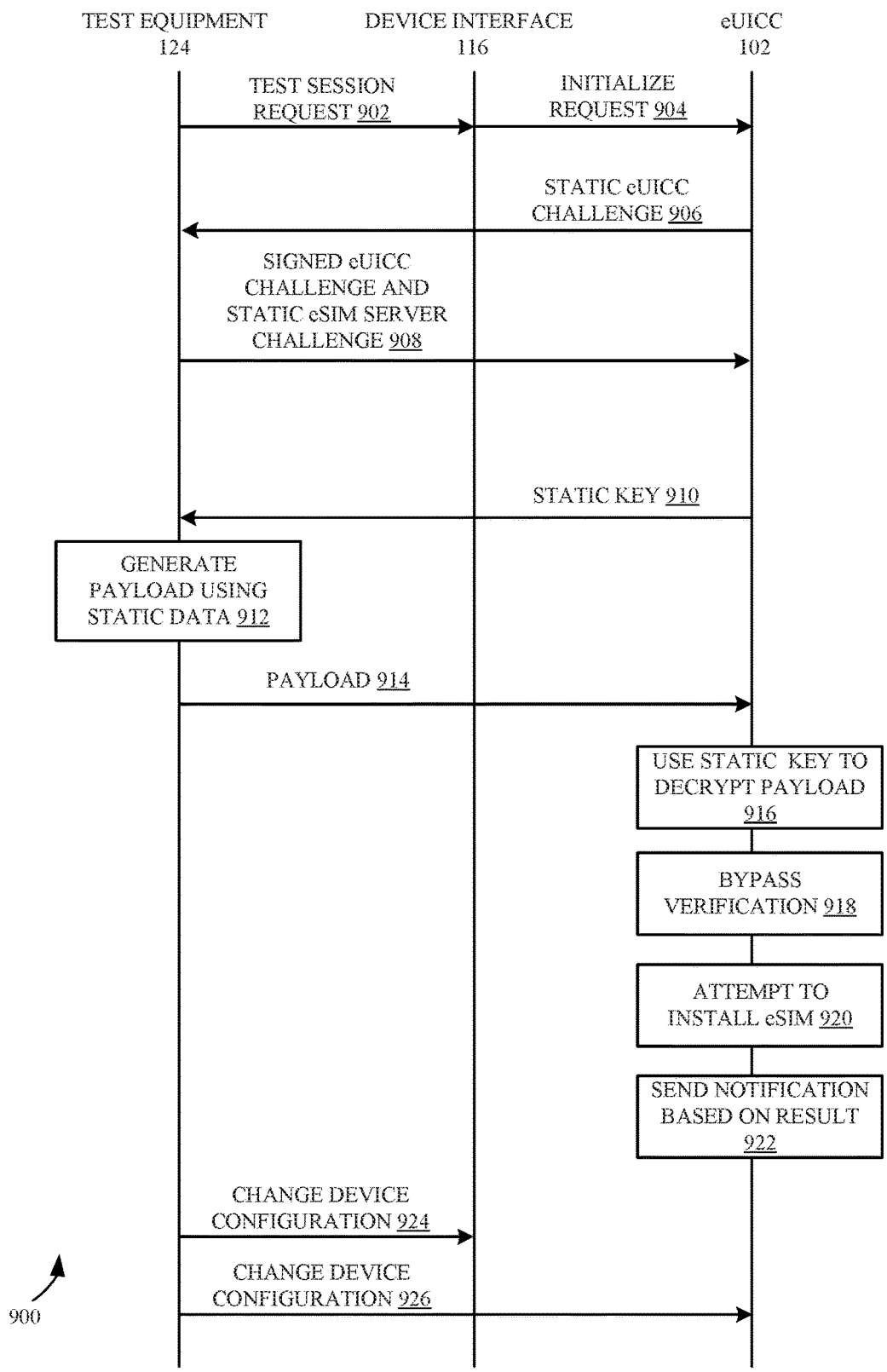
FIG. 9 illustrates an exemplary testing that uses static data in accordance with some embodiments.

FIG. 9 illustrates exemplary message and event sequences of another testing 900 of the eUICC 102 in accordance with an alternative embodiment. In some cases, testing 900 can be an offline testing. Testing 900 can involve the use of static data and static keys, which will be discussed in detail below. A static data value, also referred to as static data, can be referred to a predetermined fixed value that can be used repeatedly among different test sessions. The static data can include static eUICC Challenge, static eUICC public-private key pair, static eSIM server Challenge, static eSIM server public-private key pair, static transaction identifier, and static host identifier.

In accordance with some embodiments, the test equipment 124 can be used in place of a live eSIM server. Testing 900 can begin directly with the test equipment 124 working with device interface 116 and the eUICC 102. At step 902, the test equipment 124 can send a test request to device interface 116. In turn, at step 904, the device interface 116 can send an initialize request to the eUICC 102 to request for an initialization of a provisioning session.

In response to the initialization request, at step 906 the eUICC 102 can send a static eUICC Challenge to the test equipment 124. In response, at step 908, the test equipment 124 can sign the static eUICC Challenge and also send a static eSIM server Challenge (the test equipment 124 is acting like an eSIM server). At step 910, the eUICC 102 can have a static public-"private" key pair and can send the public key to the test equipment 124. Since the values of static public-"private" key pair are predetermined before testing 900, the "private" key is not truly an unshared value because the value is known. At step 910, the eUICC 102 can also sign the static eSIM server Challenge and transmit the signature to the test equipment 124.

At step 912, the test equipment 124 can have its own static public-"private" key pair. Again, the "private" key of test equipment is not truly private because the static key is predetermined. Then the test equipment 124 can use the public keys and the private key of the test equipment 124 to generate a session key. The test equipment 124 can also generate a payload using static data. For example, the static data can be a dummy eSIM that does not contain sensitive data. Since many data and keys in testing 900 are predetermined, testing 900 has a lower level of security compared to the testing described in FIGS. 2-3B. Hence, a dummy eSIM that does not contain sensitive data such as network access keys (as opposed to an actual operable eSIM in FIGS. 2-3B) is used to generate the payload that contains an eSIM package. The session key can encrypt the dummy eSIM profile. At step 914, the test equipment 124 can transmit the payload to the eUICC 102.

At step 916, the eUICC 102 can use the static keys to generate a session key and use the key to decrypt the encrypted eSIM package. At 918, some of the authentication procedures can be bypassed. After the eSIM package is decrypted, the eUICC 102 can attempt to install the eSIM at step 920. After the installation attempt, the eUICC 102 at step 922 can provide notifications to the device interface 116 and/or the test equipment 124. At step 924, the test equipment 124 can provide post-installation commands to the device interface 116. At step 926, the test equipment 124 can also provide post-installation commands to the eUICC 102. The post-installation commands can include listing notifications on the eUICC 102, retrieving notifications form the eUICC 102, removing notifications, deleting the installed eSIM, changing configuration of the wireless device, changing configuration of eUICC, starting another session of testing, and/or terminating the debug mode.

The steps in FIG. 9 can be repeated for another session of testing until the debug mode of the eUICC 102 is terminated.

eUICC Details

Figure 10:
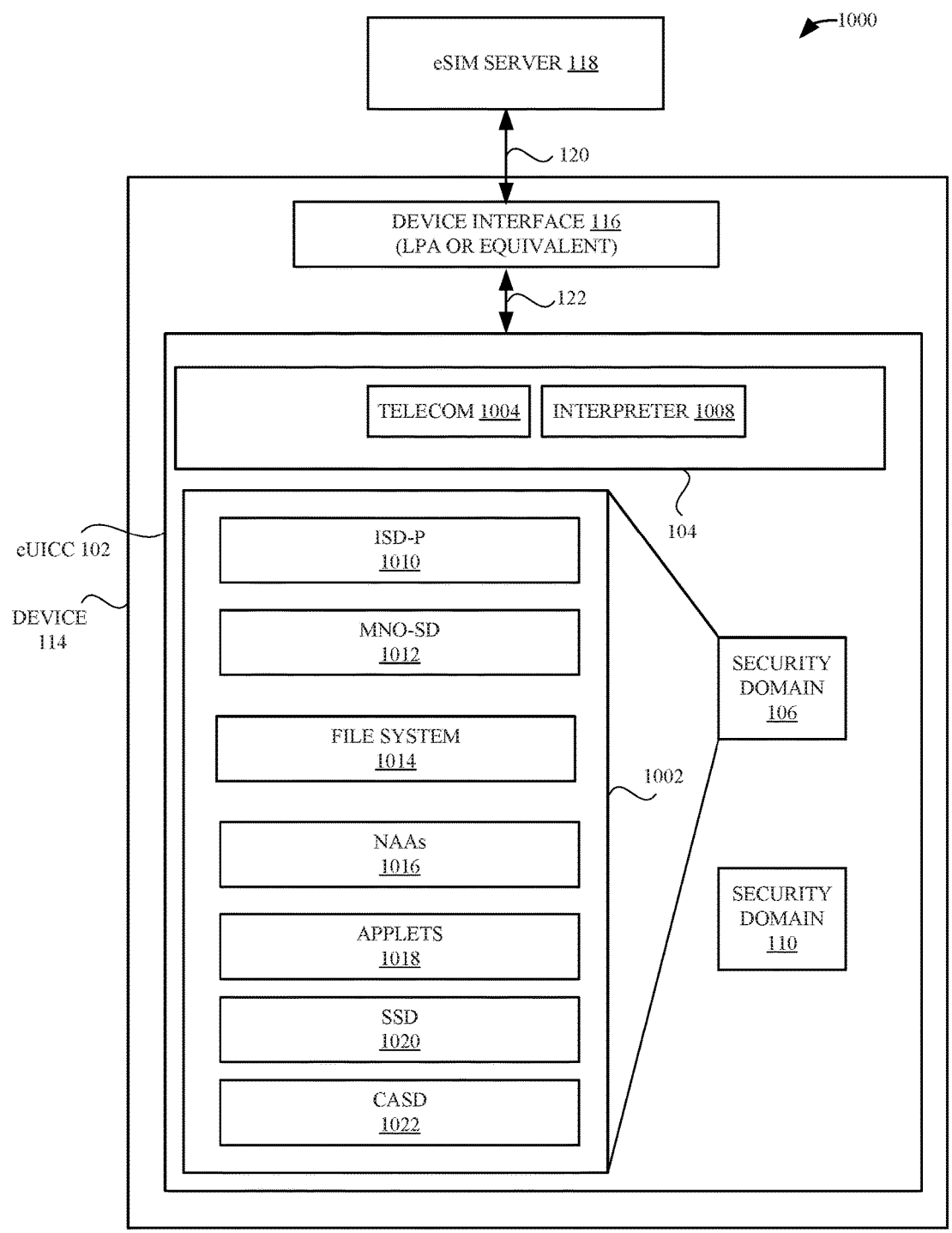
FIG. 10 illustrates an exemplary profile and other components described herein, in accordance with some embodiments.

FIG. 10 illustrates a system 1000 with details of the eUICC 102 including a profile 1002 that can be stored in security domain 106. The security domain 106 can be a memory or a sector of memory. The profile 1002 can be deployed as part of an eSIM profile package to the eUICC 102 via the device 114. The eUICC 102 can include the eUICC OS 104. Within the eUICC OS 104 can be a telecom framework 1004 which provides authentication algorithms to network access applications (such as NAAs 1016). Interpreter 1008 can translate profile package data into an installed profile using a specific internal format of the eUICC 102. ISD-P 1010 can host the profile 1002. Profiles can also be referred to as eSIMs. The ISD-P can be a secure container (security domain) for the hosting of the profile 1002. The ISD-P can be used for eSIM download and installation in collaboration with the interpreter 1008 for the decoding of a received bound profile package (BPP). An ISD-R (not shown) on the eUICC 102 can be responsible for the creation of new ISD-Ps on the eUICC 102 and the lifecycle management of all ISD-Ps on the eUICC 102. The security domain 110 can provide secure storage of credentials needed to support the security domains on the eUICC 102. In some embodiments, the various keys described herein, for example, otPK.EUICC and/or S-ENC, are stored in the security domain 110. MNO-SD 1012 can be the representative on the eUICC 102 of the operator providing services via the profile 1002 to the end user 1102. The MNO-SD 1012 can contain the operator's OTA keys and provides a secure OTA channel. Further description of profile management in a consumer device can be found in SGP.22. The profile 1002 can also include a file system 1014, applets 1018, a supplemental security domain (SSD) 1020, and a controlling authority security domain (CASD) 1022.

Example Device Connections

Figure 11:
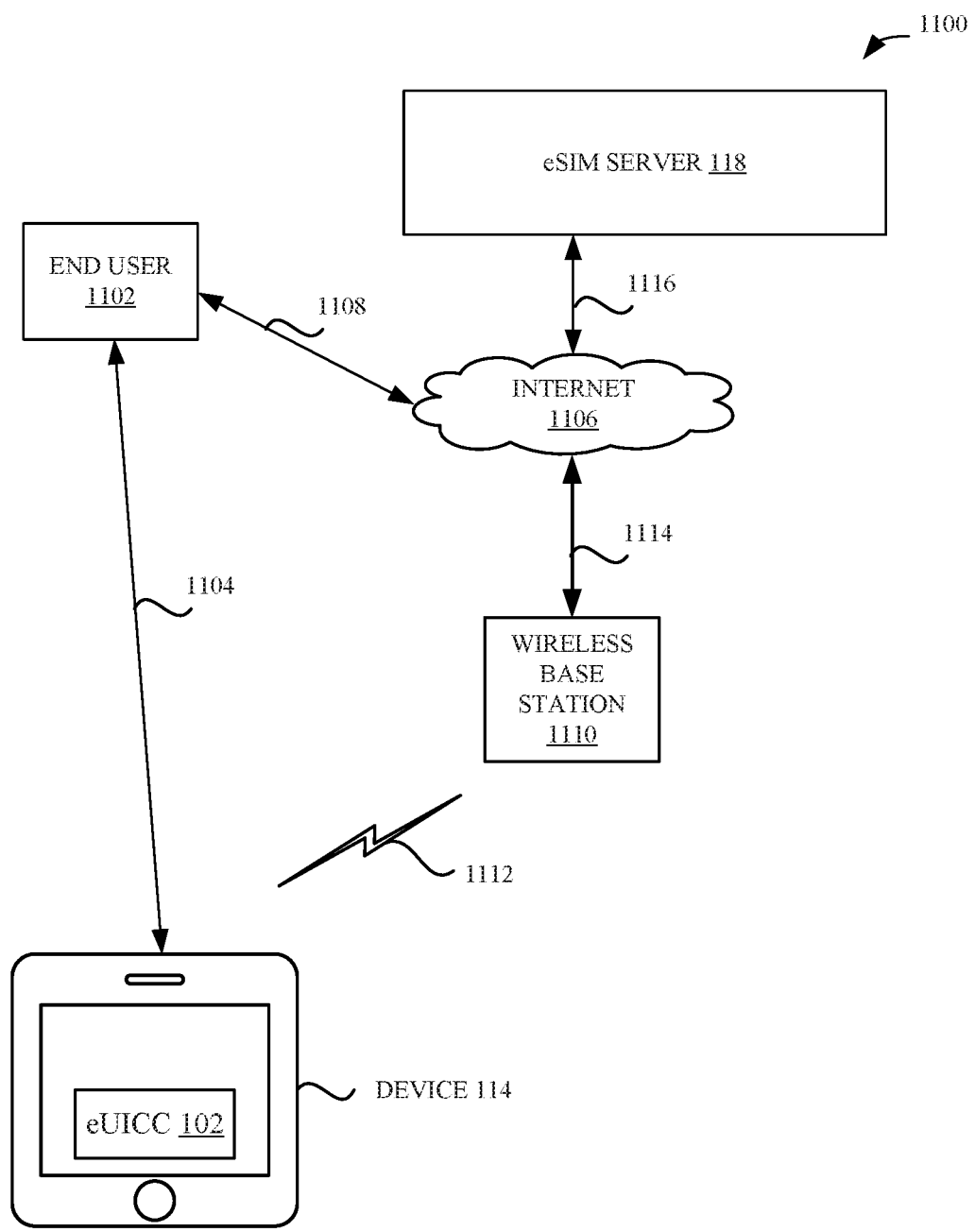
FIG. 11 illustrates an exemplary communication and provisioning system, in accordance with some embodiments.

FIG. 11 illustrates example connection methods for an exemplary live provisioning session in a system 1100. The eUICC OS 104 has been tested by the methods given above. End user 1102 can manage device 114 using interface 1104 which can convey end user actions such as requesting a new carrier plan which can trigger an initialize request. The end user 1102 can also remotely manage device 114 via the Internet 1106 using interface 1108. The device 114 can be connected to a wireless base station 1110. The wireless base station 1110 can communicate with the Internet 1106 via the link 1114. The wireless base station 1110 can communicate with the device 114 via a wireless link 1112. The wireless base station 1110 can be an Institute of Electronic and Electrical Engineers 802.11 Wireless Fidelity (IEEE 802.11 Wi-Fi) access point (AP) or the wireless base station 1110 can be, for example, a cellular mobile network base station. Examples of cellular mobile network base stations are a 2G or 3G base station or an LTE eNode B. The eSIM server 118 is also shown in communication with the Internet 1106, via the link 1116.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 12:
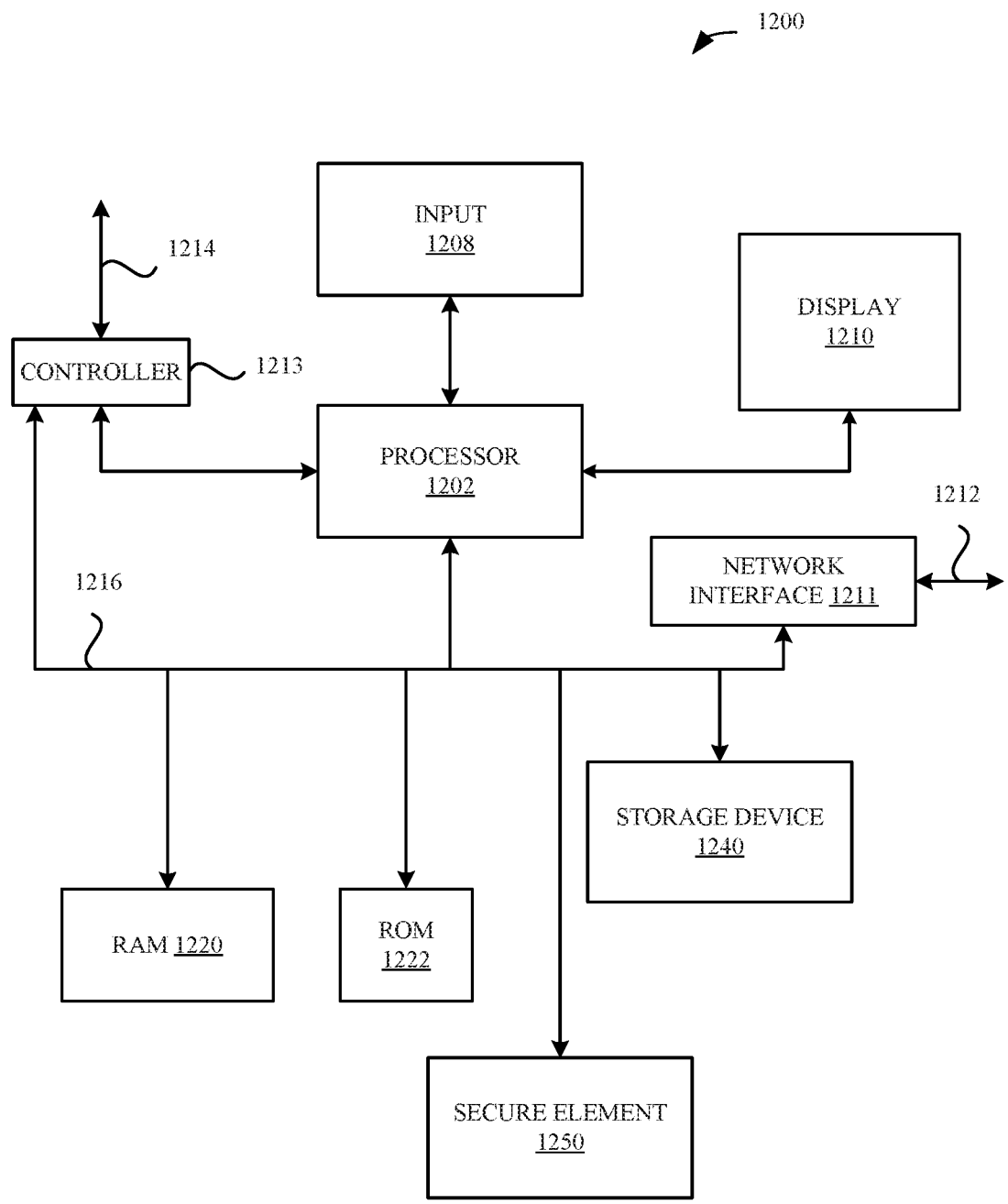
FIG. 12 illustrates an exemplary apparatus for implementation of the embodiments disclosed herein, in accordance with some embodiments.

FIG. 12 illustrates in block diagram format an exemplary computing device 1200 that can be used to implement the various components and techniques described herein, according to some embodiments. In particular, the detailed view of the exemplary computing device 1200 illustrates various components that can be included in one or more of the device 114, the eUICC 102, the eSIM server 118, and/or test equipment 124. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user (for example, information relating to incoming, outgoing, or active communication session). A data bus 1216 can facilitate data transfer between at least a storage device 1240, the processor 1202, and a controller 1213. The controller 1213 can be used to interface with and control different equipment through an equipment control bus 1214. The computing device 1200 can also include a network/bus interface 1211 that couples to a data link 1212. In the case of a wireless connection, the network/bus interface 1211 can include wireless circuitry, such as a wireless transceiver and/or baseband processor.

The computing device 1200 also includes a storage device 1240, which can comprise a single storage or a plurality of storages (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory ("RAM") 1220 and a Read-Only Memory ("ROM") 1222. The ROM 1222 can be a non-transitory computer-readable storage medium that stores programs, utilities or processes to be executed in a non-volatile manner by one or more processors to perform different operations. The RAM 1220 can provide volatile data storage, and stores instructions related to the operation of the computing device 1200. The computing device 1200 also can house a secure element 1250. The computing device 1200 also may be said to host the secure element 1250. In some embodiments, the secure element 1250 can be an eUICC.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer-readable storage medium. A computer-readable storage medium can be any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
   at an embedded Universal Integrated Circuit Card (eUICC):
      in a first installation session, installing to a memory of the eUICC an eSIM based on an eSIM package received from an eSIM server;
      in a second installation session:
         bypassing an authentication of the eSIM server; and
         installing to the memory the eSIM based on the eSIM package captured by test equipment.

2. The method as recited in claim 1, wherein, in the second installation session, the eUICC receives the eSIM package from the test equipment and uses a secret to decrypt the eSIM package.

3. The method as recited in claim 2, wherein the secret is a shared secret that is generated by the eUICC based on an ephemeral public key of the eSIM server and an ephemeral private key of the eUICC.

4. The method as recited in claim 1, wherein the eUICC receives the eSIM package from the test equipment, which captures the eSIM package during the first installation session.

5. The method as recited in claim 1, further comprising:
   in the first installation session, generating a secret with the eSIM server by at least:
      generating an ephemeral eUICC public key and an ephemeral eUICC private key,
      transmitting the ephemeral eUICC public key to the eSIM server, receiving an ephemeral eSIM server public key from the eSIM server, and
generating the secret based on the ephemeral eSIM server public key and the ephemeral eUICC private key.

6. The method as recited in claim 1, wherein bypassing the authentication of the eSIM server in the second installation session comprises bypassing verification of a signature in the second installation session.

7. The method as recited in claim 6, wherein bypassing the authentication of the eSIM server further comprises bypassing verification of a second signature received with the eSIM package.

8. The method as recited in claim 1, further comprising repeating the second installation session using a secret generated with the eSIM server in the first installation session.

9. The method as recited in claim 1, further comprising:
in the second installation session:
receiving the eSIM package from the test equipment;
decrypting the eSIM package using a secret; and
retaining an ability to regenerate the secret.

10. A non-transitory computer-readable storage medium configured to store instructions that, when executed by one or more processors included in an embedded Universal Integrated Circuit Card (eUICC), cause the eUICC to perform operations comprising:
in a first installation session, installing to a memory of the eUICC an eSIM based on an eSIM package received from an eSIM server;
in a second installation session:
bypassing an authentication of the eSIM server; and
installing to the memory the eSIM based on the eSIM package captured by test equipment.

11. The non-transitory computer-readable storage medium as recited in claim 10, wherein bypassing the authentication of the eSIM server in the second installation session comprises bypassing a verification of a signature received with the eSIM package.

12. The non-transitory computer-readable storage medium as recited in claim 10, wherein the operations further comprise sending a notification to a wireless device that hosts the eUICC based on a result of the second installation session.

13. The non-transitory computer-readable storage medium as recited in claim 10, wherein the operations further comprise performing multiple subsequent installation sessions and storing multiple notifications of the multiple subsequent installation sessions at the memory of the eUICC.

14. The non-transitory computer-readable storage medium as recited in claim 10, wherein the eSIM package received from the eSIM server in the first installation session is encrypted.

15. The non-transitory computer-readable storage medium as recited in claim 10, wherein the operations further comprise:
changing a configuration of the eUICC after the second installation session, and receiving the eSIM package in a third installation session after the changing of the configuration of the eUICC.

16. An embedded Universal Integrated Circuit Card (eUICC) comprising:
a memory for storing electronic Subscriber Identity Modules (eSIMs);
a processor configured to perform steps that comprise:
in a first installation session, installing to the memory an eSIM based on an eSIM package received from an eSIM server;
in a second installation session;
bypassing an authentication of the eSIM server; and
installing to the memory the eSIM based on the eSIM package captured by test equipment.

17. The eUICC as recited in claim 16, wherein:
in the first installation session, the steps further comprise:
receiving from the eSIM server a plurality of bits for a signature, and
verifying the signature based on the plurality of bits; and
in the second installation session, the bypassing the authentication of the eSIM server comprises bypassing verification of the signature based on the plurality of bits.

18. The eUICC as recited in claim 16, wherein the steps further comprise bypassing a verification of a signature received with the eSIM package.

19. The eUICC as recited in claim 16, wherein:
the eSIM package is encrypted by a key, and
the eUICC is capable of generating the key in both the first installation session and the second installation session.

20. The eUICC as recited in claim 16, wherein the steps further comprise providing a notification to the test equipment after installing the eSIM in the second installation session.

* * * * *